United States Patent
Tsuchida

(10) Patent No.: US 9,943,763 B2
(45) Date of Patent: Apr. 17, 2018

(54) INFORMATION PROVISION METHOD

(71) Applicant: Panasonic Intellectual Property Management Co., Ltd., Osaka (JP)

(72) Inventor: Yasuhiro Tsuchida, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 424 days.

(21) Appl. No.: 14/596,449

(22) Filed: Jan. 14, 2015

(65) Prior Publication Data

US 2015/0360131 A1 Dec. 17, 2015

(30) Foreign Application Priority Data

Jun. 17, 2014 (JP) .................... 2014-124677

(51) Int. Cl.
*A63F 13/79* (2014.01)
*A63F 13/216* (2014.01)
*A63F 13/69* (2014.01)
*A63F 13/77* (2014.01)

(52) U.S. Cl.
CPC ............ *A63F 13/79* (2014.09); *A63F 13/216* (2014.09); *A63F 13/69* (2014.09); *A63F 13/77* (2014.09)

(58) Field of Classification Search
CPC ........ A63F 13/79; A63F 13/216; A63F 13/69; A63F 13/07; G06Q 30/02; G07F 17/32; G07F 17/3237; G07F 17/3255
See application file for complete search history.

(56) References Cited

U.S. PATENT DOCUMENTS

2003/0216961 A1* 11/2003 Barry .................... A63F 13/12
705/14.12
2008/0167118 A1* 7/2008 Kroeckel ............... G07F 17/32
463/1

FOREIGN PATENT DOCUMENTS

JP 2008-093164 4/2008
JP 2010-005255 1/2010

* cited by examiner

*Primary Examiner* — Werner Garner
(74) *Attorney, Agent, or Firm* — Greenblum & Bernstein, P.L.C.

(57) ABSTRACT

An information equipment has obtained identification information including a store ID indicating a predetermined shop store. An application ID indicating a game application running on information equipment and a user ID indicating a user of the game application are received together with the store ID over a network from the information equipment. A first database which manages a progress level of the game for the user in association with the application ID and the user ID and a second database which manages the application ID and a first game remuneration ID indicating a first game remuneration corresponding to the progress level are referred to, in accordance with the application ID and the user ID. First indication data indicating that the first game remuneration corresponding to the progress level of the game is provided to the user of the game application is transmitted over the network to the information equipment.

13 Claims, 55 Drawing Sheets

FIG. 10A https://serverdomain.com/login.jsp? app_user_id=1234ABCD-1234-ABCD-1234-1234567890AB&app_id=app00001&action=view

FIG. 10B https://serverdomain.com/login.jsp? app_user_id=1234ABCD-1234-ABCD-1234-1234567890AB&app_id=app00001&action=login&user_name=tarou&password=pswd

FIG. 10C

{"ERROR":"NONE"}

FIG. 10D

{"ERROR":"BAD_USERNAME_OR_PASSWORD"}

FIG. 13A 151

| USER ID | USER NAME | PASSWORD |
|---|---|---|
| USER1 | tarou | pswd |

| USER ID | APP USER ID | APP ID | SCORE | LEVEL | STAMP SHEET | NUMBER OF STAMPS |
|---|---|---|---|---|---|---|
| USER1 | 1234ABCD-1234-ABCD-1234-1234567890AB | app00001 | 50 | 1 | 2 | 0 |
| USER1 | 5678EFAB-5678-EFAB-5678-CDEF01234567 | app00002 | 2400000 | 2 | 5 | 3 |

| USER ID | APP USER ID | APP ID | SCORE | LEVEL | STAMP SHEET | NUMBER OF STAMPS |
|---|---|---|---|---|---|---|
| USER1 | 1234ABCD-1234-ABCD-1234-1234567890AB | app00001 | 50 | 1 | 2 | 1 |
| USER1 | 5678EFAB-5678-EFAB-5678-CDEF01234567 | app00002 | 2400000 | 2 | 5 | 3 |

152f

| NUMBER OF ACQUIRED STAMPS | 0 |
| --- | --- |
| GOAL STAMP NUMBER | 5 |
| MESSAGE | 1/20 to 1/31 Get a stamp at P Center Osaka!! |

FIG. 19

| STORE ID | STORE NAME | CATEGORY TREND | DEVELOPER TREND | APP TREND | ADVERTISEMENT ID | VISITOR ADVERTISEMENT ID | LATITUDE | LONGITUDE | MESSAGE |
|---|---|---|---|---|---|---|---|---|---|
| str00001 | A RESTAURANT | | | App00001 (0.2) | ad00001 | ad00001a | 34.70889 | 135.4944 | 10 stamps with purchase of 500 yen or more!! |
| str00002 | B FURNITURE STORE | | CCC (0.3) | | ad00002 | ad00002a | 34.6123 | 135.1212 | 1/25 & 1/26 10% discount on all items!! |
| str00003 | C SPORTS STORE | SPORTS (0.8) | | | ad00003 | ad00003a | 34.72112 | 135.3123 | 2/1 & 2/2 Double points!! |
| str00004 | P CENTER OSAKA | STORE OPERATION (0.5) | | | ad00004 | ad00004a | 34.6657 | 135.2132 | 1/20 to 1/31 Get a stamp at P Center Osaka!! |
| str00005 | E DRUGSTORE | | DDD (0.2) | | ad00005 | ad00005a | 34.72101 | 135.3122 | Collaboration with sports games is now underway!! |

FIG. 20

| APP ID | REWARD ID | STAMP SHEET ORDINAL NUMBER | GOAL STAMP NUMBER |
|---|---|---|---|
| app00001 | rwd00002 | 1 | 3 |
| app00001 | rwd00002 | 2 | 5 |
| app00001 | rwd00002 | 3 | 7 |
| app00001 | rwd00002 | 4 | 10 |
| app00001 | rwd00003 | 5 | 15 |
| app00002 | rwd00002 | 1 | 3 |
| app00002 | rwd00002 | 2 | 5 |
| app00002 | rwd00002 | 3 | 7 |
| app00002 | rwd00002 | 4 | 10 |
| app00002 | rwd00003 | 5 | 15 |

FIG. 23

```
select * from stores_table
where SQRT( POW( 6387.137 * (PI()/180 * (lat-latitude)), 2)+
      POW(COS( PI() / 180 * latitude ) * 6387.137 * (PI()/180 * (lng-longitude)),2))
      < 0.5;
```

| USER ID | LEVEL | CONDITION | REWARD ID |
|---|---|---|---|
| app00001 | 1 | TOTAL AMOUNT OF SALES FOR TODAY IS NOT LESS THAN 1,000 | rwd00008 |
| app00001 | 2 | TOTAL AMOUNT OF SALES FOR TODAY IS NOT LESS THAN 10,000 | rwd00008 |
| app00001 | 3 | TOTAL AMOUNT OF SALES FOR TODAY IS NOT LESS THAN 100,000 | rwd00008 |

FIG. 41

| APP ID | REWARD ID | REWARD TYPE | REWARD NAME | REWARD IMAGE | REWARD QUANTITY |
|---|---|---|---|---|---|
| app00001 | rwd00001 | STAMP | STAMP | stamp.png | 3 |
| app00001 | rwd00002 | ITEM | MAGICAL STONE | gem.png | 3 |
| app00001 | rwd00003 | ITEM | MAGICAL STONE | gem.png | 5 |
| app00001 | rwd00004 | ITEM | MAGICAL STONE | gem.png | 10 |
| app00001 | rwd00005 | ITEM | CLOTHES | item1.png | 3 |
| app00001 | rwd00006 | ITEM | HEADGEAR | item2.png | 3 |
| app00001 | rwd00007 | ITEM | SHOES | item3.png | 3 |
| app00001 | rwd00008 | STAMP | STAMP | stamp.png | 1 |
| app00002 | rwd00001 | STAMP | STAMP | stamp.png | 3 |
| app00002 | rwd00002 | ITEM | ANALEPTICUM | medi.png | 10 |
| app00002 | rwd00003 | ITEM | ANALEPTICUM | medi.png | 50 |
| app00002 | rwd00004 | ITEM | BASEBALL CAP | hat.png | 1 |
| app00002 | rwd00005 | ITEM | BASEBALL BALL | ball.png | 1 |
| app00002 | rwd00006 | STAMP | STAMP | stamp.png | 1 |

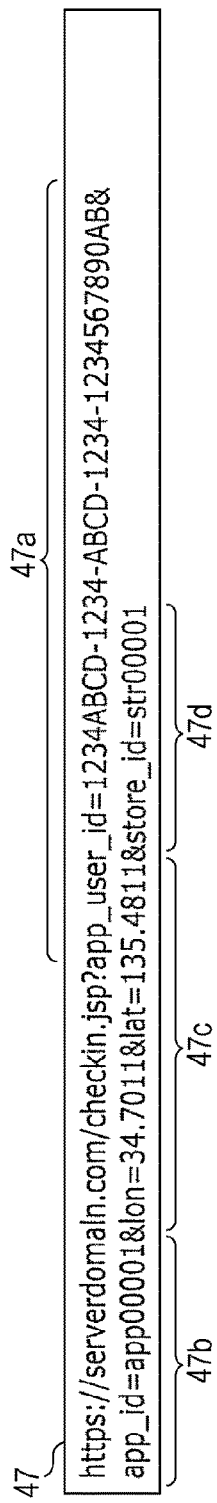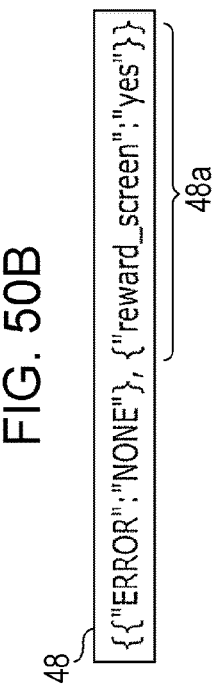

FIG. 53

| APP ID | LEVEL | REWARD ID | REWARD PROBABILITY |
|---|---|---|---|
| app00001 | * | rwd00001 | 100% |
| app00001 | 1 | rwd00002 | 10% |
| app00001 | 1 | rwd00005 | 90% |
| app00001 | 2 | rwd00003 | 10% |
| app00001 | 2 | rwd00006 | 90% |
| app00001 | 3 | rwd00004 | 10% |
| app00001 | 3 | rwd00007 | 90% |
| app00002 | * | rwd00001 | 100% |
| app00002 | 1 | rwd00002 | 5% |
| app00002 | 1 | rwd00004 | 95% |
| app00002 | 2 | rwd00003 | 5% |
| app00002 | 2 | rwd00005 | 95% |

| ADVERTISEMENT ID | ADVERTISEMENT TOPIC | BANNER IMAGE |
|---|---|---|
| ad00001 | 1/20 to 1/31 Get a stamp at P Center Osaka!! | banner01.png |
| ad00001a | Get a free special game item now with purchase of 1,000 yen or more!! | banner02.png |

| STORE ID | BUYING ID | BUYING INFORMATION | PURCHASER BENEFIT ID | USED FLAG |
|---|---|---|---|---|
| str00004 | buy00001 | PURCHASE OF LESS THAN 1,000 YEN | 1 | NO |
| str00004 | buy00002 | PURCHASE OF LESS THAN 1,000 YEN | 1 | NO |
| str00004 | buy00003 | PURCHASE OF NOT LESS THAN 1,000 YEN | 2 | NO |
| str00004 | buy00004 | PURCHASE OF NOT LESS THAN 1,000 YEN | 2 | NO |

133a

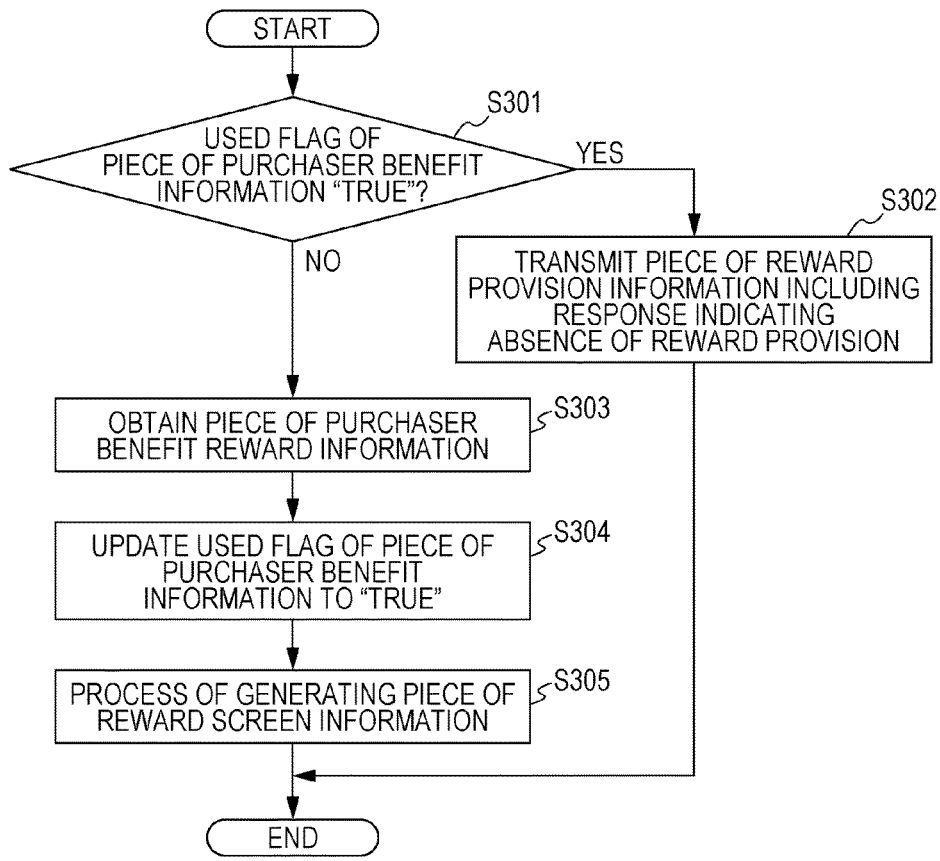

INFORMATION PROVISION METHOD

BACKGROUND

1. Technical Field

The present disclosure relates to an information provision method for information equipment loaded with an application for a game.

2. Description of the Related Art

Japanese Unexamined Patent Application Publication No. 2008-093164 discloses a technique for providing motivation to increase the number of executions or the execution time of a game to a player. In the technique in Japanese Unexamined Patent Application Publication No. 2008-093164, point information of a player is updated if a given condition is satisfied in a game, and the amount of change in the point information is increased with increase in the number of times the given condition has been satisfied.

Japanese Unexamined Patent Application Publication No. 2010-005255 discloses a technique for judging from the progress of a game whether a gameplay condition set in advance is achieved. In Japanese Unexamined Patent Application Publication No. 2010-005255, item acquisition information is generated using an item ID associated with the achieved gameplay condition. Additionally, it is judged in the technique in Japanese Unexamined Patent Application Publication No. 2010-005255 whether an item acquisition condition for a special item is achieved. If the acquisition condition for the special item is achieved, item acquisition information is generated using an item ID associated with the special item.

SUMMARY

One non-limiting and exemplary embodiment provides an information provision method which is capable of providing an incentive to visit a real store to a game player, using the above-described games.

In one general aspect, the techniques disclosed here feature A method for providing information in an information management system connected over a network to information equipment, the information equipment storing a game application and having a display, a game remuneration being obtained corresponding to a progress level of a game using the game application, the method comprising:

receiving i) an application ID indicating the game application running on the information equipment and ii) a user ID indicating a user of the game application together with a store ID indicating a predetermined shop store, over the network from the information equipment that obtains identification information including the store ID in advance; and referring, in accordance with the application ID and the user ID, to a first database which manages the progress level of the game for the user of the game application in association with the application ID and the user ID and to a second database which manages the application ID and a first game remuneration ID that indicates a first game remuneration corresponding to the progress level of the game, and transmits over the network to the information equipment first indication data indicating that the first game remuneration corresponding to the progress level of the game is provided to the user of the game application.

An information provision method according to the present disclosure can give a game player an incentive to visit a real store.

Additional benefits and advantages of the disclosed embodiments will become apparent from the specification and drawings. The benefits and/or advantages may be individually obtained by the various embodiments and features of the specification and drawings, which need not all be provided in order to obtain one or more such benefits and/or advantages.

BRIEF DESCRIPTION OF THE DRAWINGS

FIGS. 10A to 10D are views showing examples of HTML documents for a component request, a login request, and responses to a login request;

FIGS. 13A to 13C are charts showing user login information and user achievement information in the user information DB;

FIG. 19 is a chart showing an example of store attribute information in the store information DB;

FIG. 20 is a chart showing an example of stamp information in the game app information DB;

FIG. 23 is a view showing a description of a case of searching for a piece of store attribute information belonging to an area within 500 m in the neighborhood using SQL;

FIG. 34 is a chart showing an example of reward provision condition information;

FIG. 41 is a chart showing an example of reward list information;

FIGS. 50A and 50B are views showing examples of a checkin request and a piece of reward provision information;

FIG. 53 is a chart showing an example of reward probability information;

FIG. 54 is a chart showing an example of advertisement information;

FIG. 55 is a chart showing an example of purchaser benefit information;

FIG. 58 is a flowchart of the purchaser benefit provision process; and

FIG. 59 is a chart showing an example of purchaser benefit reward information.

Figure 1:
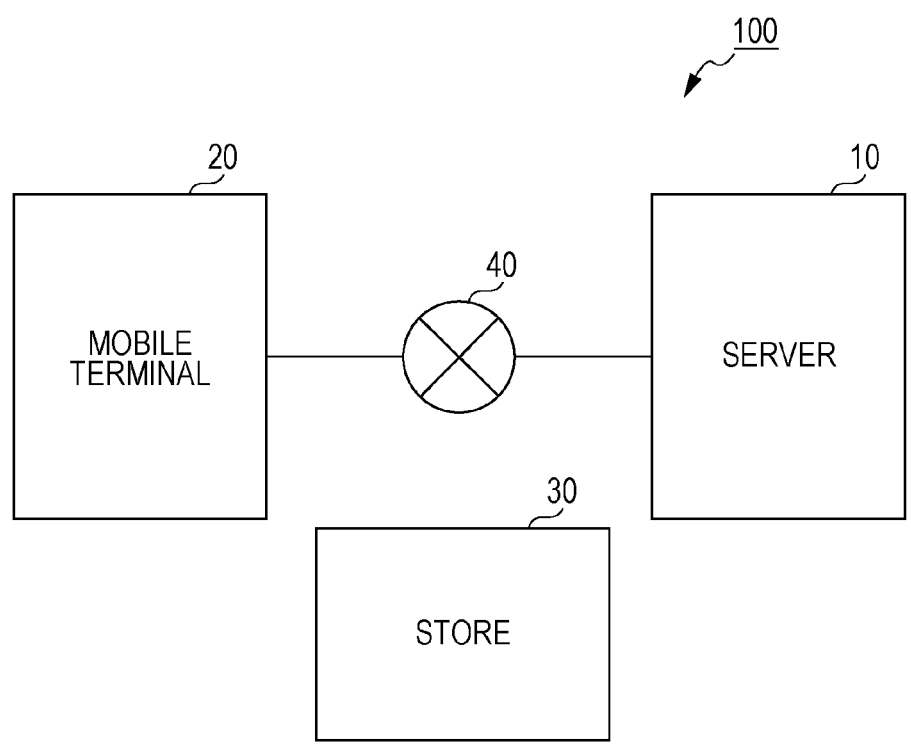
FIG. 1 is a diagram showing the schematic configuration of a game reward provision system according to a first embodiment.

DETAILED DESCRIPTION (Underlying Knowledge Forming Basis of One Aspect of the Present Disclosure)

First, points forming basis of one aspect of the present disclosure will be described.

A user (player) can download an application for a game using information equipment, such as a smartphone. Games to be downloaded include a game in which a game remuneration is obtained corresponding to a progress level of the game, as in Japanese Unexamined Patent Application Publication Nos. 2008-093164 and 2010-005255.

An example of the game is a game based on the rule that a user sells merchandise in the game and is provided with a stamp when the sales of the merchandise reach a first target amount. In this game, an additional stamp is provided when the sales made by the user reach a next target amount. If the user obtains a predetermined number of (for example, five) stamps, the user can acquire a game item effective in proceeding with the game.

Another example of the game is a game which has a mechanism to limit the amount of time a user can play the game and inhibit the user from restarting the game until a fixed time period elapses. An effective game item in this case has a function of shortening the fixed time period. The user can use the effective game item to restart the game without waiting for expiration of the fixed time period.

The present inventor has found a method for causing an application for a game of this kind to collaborate with a store, such as a drugstore, a variety store, or a clothing store to link acquisition of a stamp or a game item in the game application to sales promotion in the store.

A method according to one aspect of the present disclosure is a method for providing information in an information management system connected over a network to information equipment, the information equipment storing a game application and having a display, a game remuneration being obtained corresponding to a progress level of a game using the game application, the method comprising: receiving i) an application ID indicating the game application running on the information equipment and ii) a user ID indicating a user of the game application together with a store ID indicating a predetermined shop store, over the network from the information equipment that obtains identification information including the store ID in advance; and referring, in accordance with the application ID and the user ID, to a first database which manages the progress level of the game for the user of the game application in association with the application ID and the user ID and to a second database which manages the application ID and a first game remuneration ID that indicates a first game remuneration corresponding to the progress level of the game, and transmits over the network to the information equipment first indication data indicating that the first game remuneration corresponding to the progress level of the game is provided to the user of the game application.

With this configuration, the user of the game application can obtain a game remuneration used in the game application running on the information equipment just by reading the identification information including the store ID indicating the predetermined store.

Thus, the user can obtain a game remuneration, such as a stamp or a game item, used in the game without causing the game to progress.

For example, posting (installation) of the identification information including the store ID indicating the predetermined store around or inside the predetermined store gives the user an incentive to go to the predetermined store.

As described above, according to the present aspect, it is possible to cause the game application to collaborate with the predetermined store and link obtainment of a stamp or a game item used in the game application to sales promotion at the predetermined store.

The information provision method may further include displaying a stamp card on which a first predetermined number of stamps provided, on the display of the information equipment on the basis of the first indication data if the first game remuneration indicates the first predetermined number of stamps.

The first predetermined number may increase with increase in the progress level of the game.

According to the present aspect, the number of stamps to be provided can be changed corresponding to the progress level of the game of the game application. For example, more stamps may be obtained with increase in the progress level of the game. In general, a game is created such that the difficulty of proceeding to a next level increases with increase in progress level.

For this reason, if the game is set so as to allow more stamps to be obtained with increase in the progress level of the game, the user holds the hope that the user has a higher chance of beating the game at a higher level. Such a hope prompts the user to go to a place where the identification information including the store ID indicating the predetermined store can be read. That is, obtainment of a stamp or a game item can be linked to sales promotion at the predetermined store.

The information provision method may further include displaying first display data representing that a second predetermined number of game items used in the game application are obtained to the user of the game application on the display of the information equipment on the basis of the first indication data, if the first game remuneration indicates the second predetermined number of game items.

The second predetermined number may increase with increase in the progress level of the game.

According to the present aspect, the number of game items to be provided can be changed corresponding to the progress level of the game of the game application. For example, more game items may be obtained with increase in the progress level of the game. In general, a game is created such that the difficulty of proceeding to a next level increases with increase in progress level.

For this reason, if the game is set so as to allow more game items to be obtained with increase in the progress level of the game, the user holds the hope that the user has a higher chance of beating the game at a higher level. Such a hope prompts the user to go to a place where the identification information including the store ID indicating the predetermined store can be read. That is, obtainment of a stamp or a game item can be linked to sales promotion at the predetermined store.

The first indication data may include advertisement information representing that an additional game remuneration is provided to the user of the game application upon buying at the shop store indicated by the store ID, and the information provision method may further include receiving the application ID together with a purchase ID indicating buying of merchandise or service at the shop store, over the network from the information equipment that has read the purchase ID in advance, and referring to, in accordance with the application ID, a third database which manages the application ID and a second game remuneration ID indicating a second game remuneration corresponding to the application ID, and transmitting over the network to the information equipment second indication data indicating that the second game remuneration is additionally provided to the user of the game application.

According to the present aspect, an additional game remuneration can be obtained by actually buying merchandise at the predetermined store, in addition to reading the identification information including the store ID indicating the predetermined store.

Thus, an additional game remuneration can be obtained without causing the game to progress in the game application. This gives the user an incentive to go to the predetermined store, which allows obtainment of a game remuneration used in the game to be linked to buying behavior at the predetermined store. In other words, it is possible to cause the game application to collaborate with the predetermined store and promote merchandise sales at the predetermined store using obtainment of a game remuneration used in the game application as a trigger.

The third database may manage a benefit ID indicating within which price range purchased merchandise or service falls in association with the application ID and the second game remuneration ID, and the information provision method may further include receiving the application ID together with the purchase ID and the benefit ID over the network from the information equipment that has read the purchase ID and the benefit ID in advance, and referring to, in accordance with the benefit ID and the application ID, the third database, and transmitting over the network to the information equipment the second indication data indicating that the second game remuneration is additionally provided to the user of the game application.

The information provision method may further include displaying a stamp card bearing a third predetermined number of stamps additionally provided on the display of the information equipment on the basis of the second indication data if the second game remuneration is the third predetermined number of stamps.

The third predetermined number may increase with increase in the progress level of the game.

The information provision method may further include displaying second display data representing that a fourth predetermined number of game items used in the game application are obtained to the user of the game application on the display of the information equipment on the basis of the second indication data, if the second game remuneration indicates the fourth predetermined number of game items.

The fourth predetermined number may increase with increase in the progress level of the game.

The information management system may refer to a third database which manages a registered store registered by the information management system to determine whether the shop store indicated by the received store ID is included in the registered store, and transmit the first indication data over the network to the information equipment if the store indicated by the received store ID is included in the registered store.

According to the present aspect, if the store indicated by the store ID is included in the registered store, the first indication data is transmitted to the information equipment.

On the other hand, if the store indicated by the store ID is not included in the registered store, the first game remuneration is not provided to the user. Thus, in the case of a store not collaborating with the game application, a stamp or a game item is not provided to the user. This gives the user an incentive to go to a store collaborating with the game application, which implements promotion of merchandise sales at the store.

The identification information may include first location information indicating a location of the predetermined store, and the information management system may obtain second location information indicating a location of the information equipment from the information equipment using a GPS system, and transmit the first indication data over the network to the information equipment if the location indicated by the second location information is within a predetermined distance of the location indicated by the first location information.

According to the present aspect, a game remuneration is provided to the user of the game application only if the user actually goes to a place where the identification information can be read and reads the identification information. That is, if the user is actually not in a place where the identification information can be read and reads the identification information using illicit means, a game remuneration is not provided to the user.

With this configuration, the user can obtain a game remuneration only if the user actually goes to a place where the identification information can be read and reads the identification information. It is thus possible to link obtainment of a game remuneration used in the game application to promotion of merchandise sales at the predetermined store.

The information management system may manage state information indicating that the first game remuneration is already provided to the user of the game application that is running the application indicated by the application ID and is indicated by the user ID after the first indication data is transmitted to the information equipment.

The first database may be identical to the second database.

Note that these comprehensive or specific aspects may be implemented by a system, an apparatus, an integrated circuit, a computer program, a computer-readable recording medium, such as a CD-ROM, or any selective combination thereof.

Embodiments will be specifically described below with reference to the drawings.

Note that the embodiments described below are all comprehensive or specific examples of the present disclosure. Numerical values, shapes, materials, constituent elements, the positions of and the form of connection between the constituent elements, steps, the order of the steps, and the like described in the embodiments below are merely illustrative, and are not intended to limit the present disclosure. Among the constituent elements in the embodiments below, those not described in an independent claim representing a top-level concept will be described as optional constituent elements.

Note that the drawings are schematic and not necessary to scale. Substantially the same components in the drawings are denoted by the same reference characters throughout the drawings, and redundant descriptions may be omitted or simplified.

First Embodiment

A game reward provision system according to a first embodiment will be described below. FIG. 1 is a diagram showing the schematic configuration of the game reward provision system.

As shown in FIG. 1, a game reward provision system 100 includes a server 10 and a mobile terminal 20. The server 10 and the mobile terminal 20 are connected over a network 40 (for example, the Internet). FIG. 1 also shows a store 30 as an object of collaboration with a game to be executed by the mobile terminal 20.

Note that, in the game reward provision system 100, a user downloads an application for a game (hereinafter also simply referred to as a "game app") from the server 10, using the mobile terminal 20. Information on, for example, the progress of the game for the user is stored in the server 10.

In the first embodiment, a game to be executed by the mobile terminal 20 is assumed to be a game based on the rule that a user sells merchandise in the game and is provided with a stamp when the sales of the merchandise reach a first target amount. In the game, when the sales made by the user reach a next target amount, an additional stamp is provided. When the user obtains a predetermined number of (for example, five) stamps, the user can acquire a game item effective in proceeding with the game.

A feature of the game reward provision system 100 is that the above-described stamp is provided not only corresponding to the progress level of a game but also by bringing the mobile terminal 20 to the real store 30.

Figure 2:
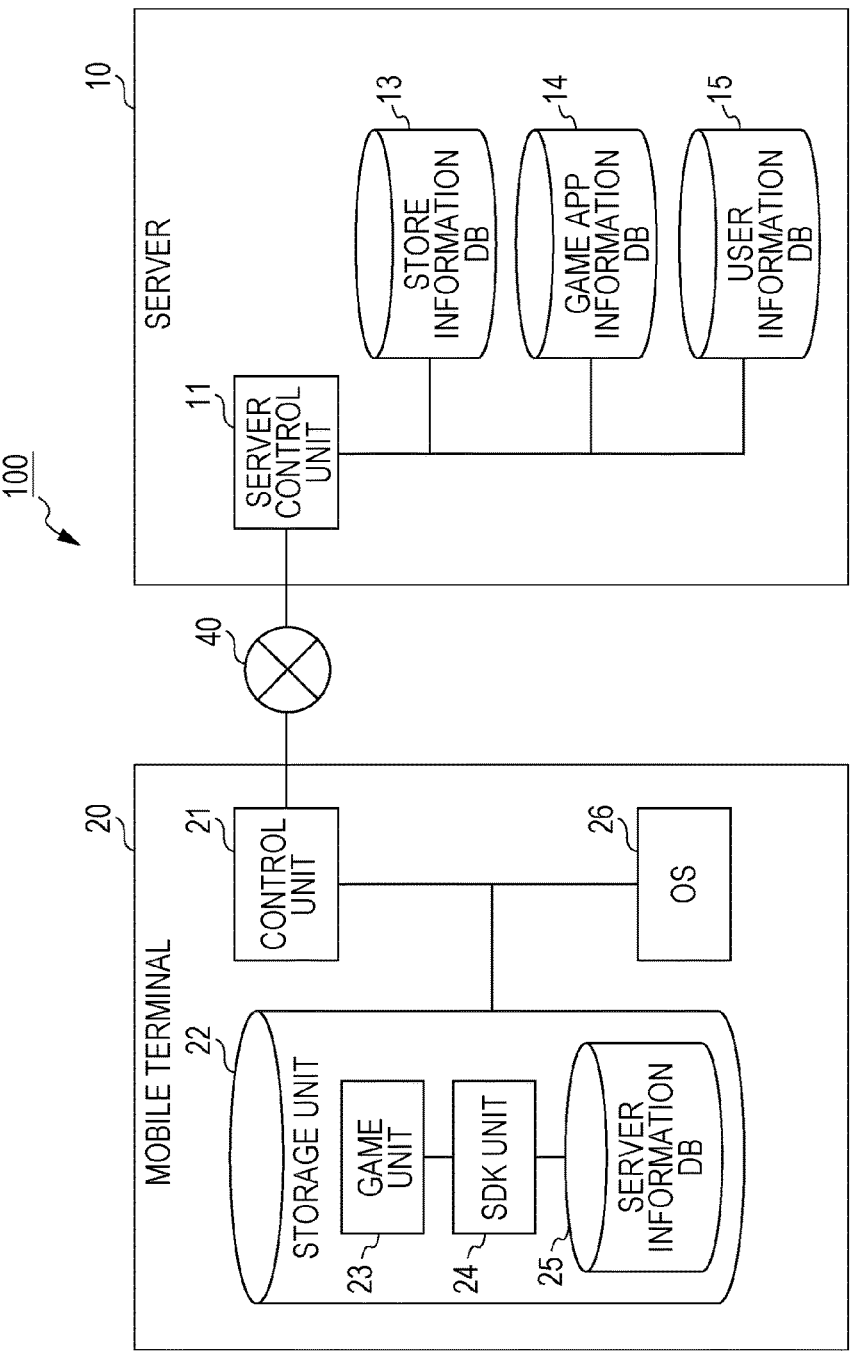
FIG. 2 is a block diagram showing the functional configuration of the game reward provision system according to the first embodiment.

The specific configuration of the game reward provision system 100 will now be described. FIG. 2 is a block diagram showing the functional configuration of the game reward provision system 100. The server 10 will be described first.

As shown in FIG. 2, the server 10 includes a server control unit 11, a store information DB 13, a game app information DB 14, and a user information DB 15.

The server control unit 11 receives each request from the mobile terminal 20, refers to the DBs (the store information DB 13, the game app information DB 14, and the user information DB 15) in response to the request, and, if necessary, updates information of the DBs. The server control unit 11 also transmits information (for example, screen information) necessary for a game to the mobile terminal 20 in response to the request.

Specifically, the server control unit 11 is a processor and may be in any form, such as a microcomputer or a dedicated circuit.

The mobile terminal 20 will be described. The mobile terminal 20 includes a control unit 21, a storage unit 22, and an operating system (OS) 26. A game app is stored in the storage unit 22, and the game app includes a game unit 23, a software development kit (SDK) unit 24, and a server information DB 25. Specifically, the mobile terminal 20 is a terminal having a display unit, such as a smartphone, a tablet terminal, or a notebook PC. Note that the display unit is not shown in FIG. 2.

The control unit 21 boots the OS 26 and executes the game app stored in the storage unit 22. The control unit 21 is a processor but may be in any form, such as a microcomputer or a dedicated circuit. Note that a process performed through execution of the game app by the control unit 21 is described simply as "the game unit 23 performs . . . " or "the SDK unit 24 performs . . . " in the embodiment below.

Figure 3:
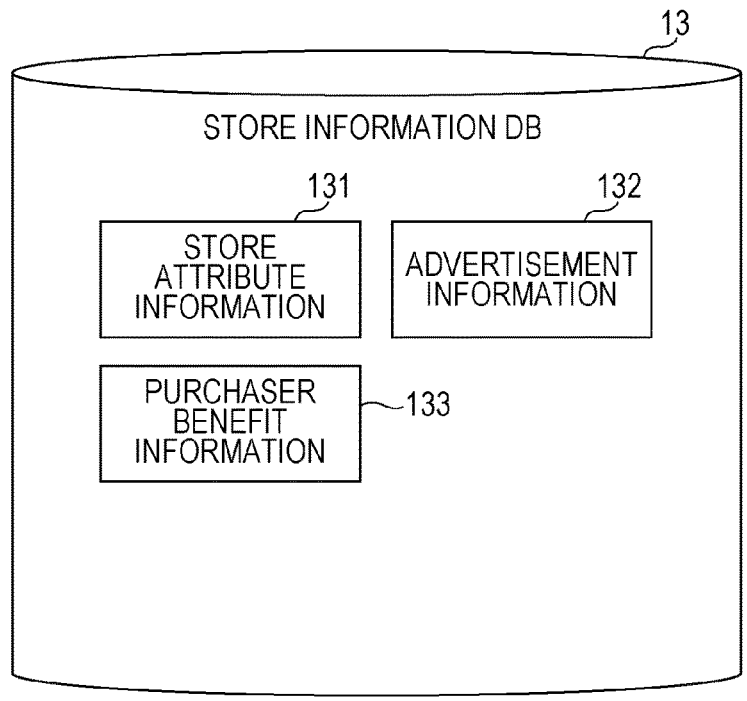
FIG. 3 is a diagram showing pieces of information stored in a store information DB.
Figure 4:
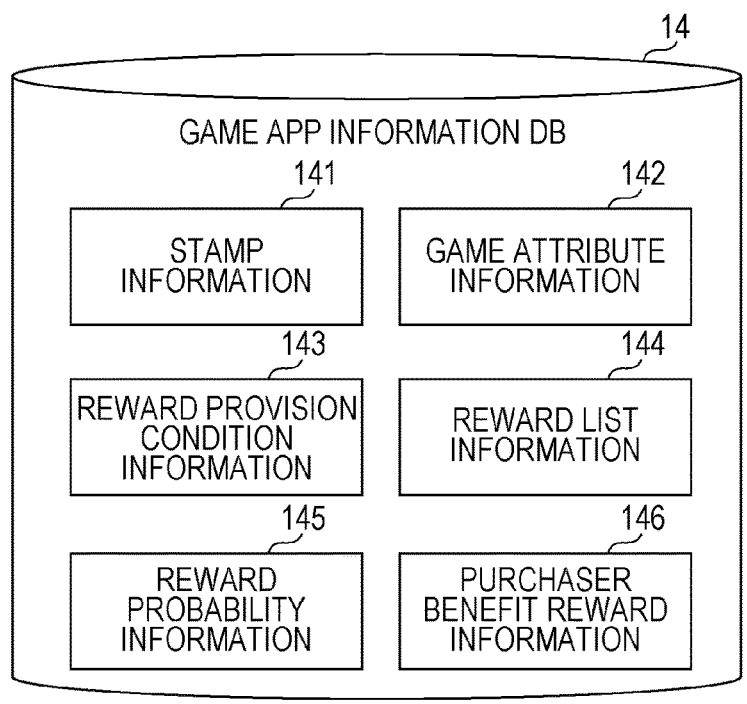
FIG. 4 is a diagram showing pieces of information stored in a game app information DB.
Figure 5:
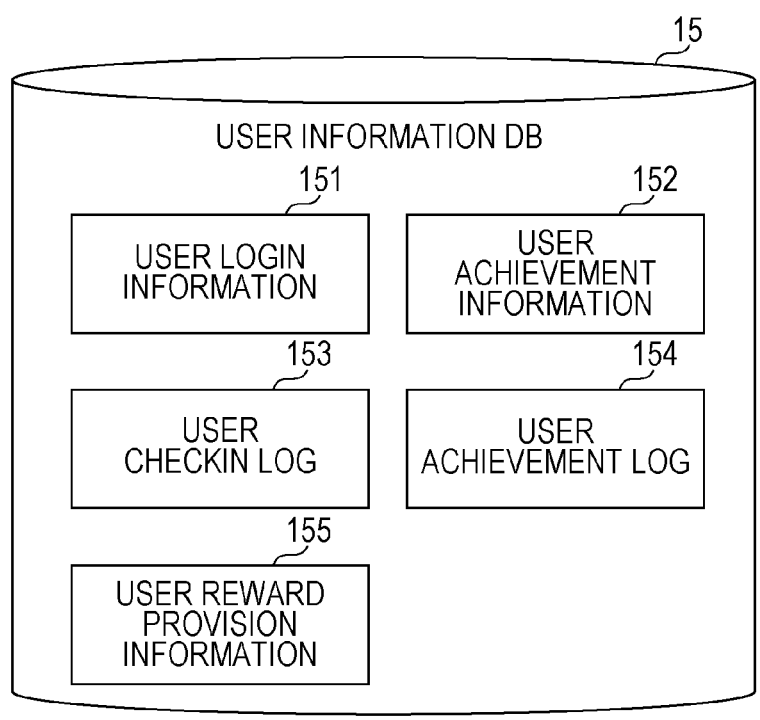
FIG. 5 is a diagram showing pieces of information stored in a user information DB.

Pieces of information stored in the DBs will be briefly described. FIG. 3 is a diagram showing pieces of information stored in the store information DB 13. FIG. 4 is a diagram showing pieces of information stored in the game app information DB 14. FIG. 5 is a diagram showing pieces of information stored in the user information DB 15.

As shown in FIG. 3, store attribute information 131, advertisement information 132, and purchaser benefit information 133 are stored in the store information DB 13.

As shown in FIG. 4, stamp information 141, game attribute information 142, reward provision condition information 143, reward list information 144, reward probability information 145, and purchaser benefit reward information 146 are stored in the game app information DB 14.

As shown in FIG. 5, user login information 151, user achievement information 152, a user checkin log 153, a user achievement log 154, and user reward provision information 155 are stored in the user information DB 15.

[Initialization Process]

Figure 6:
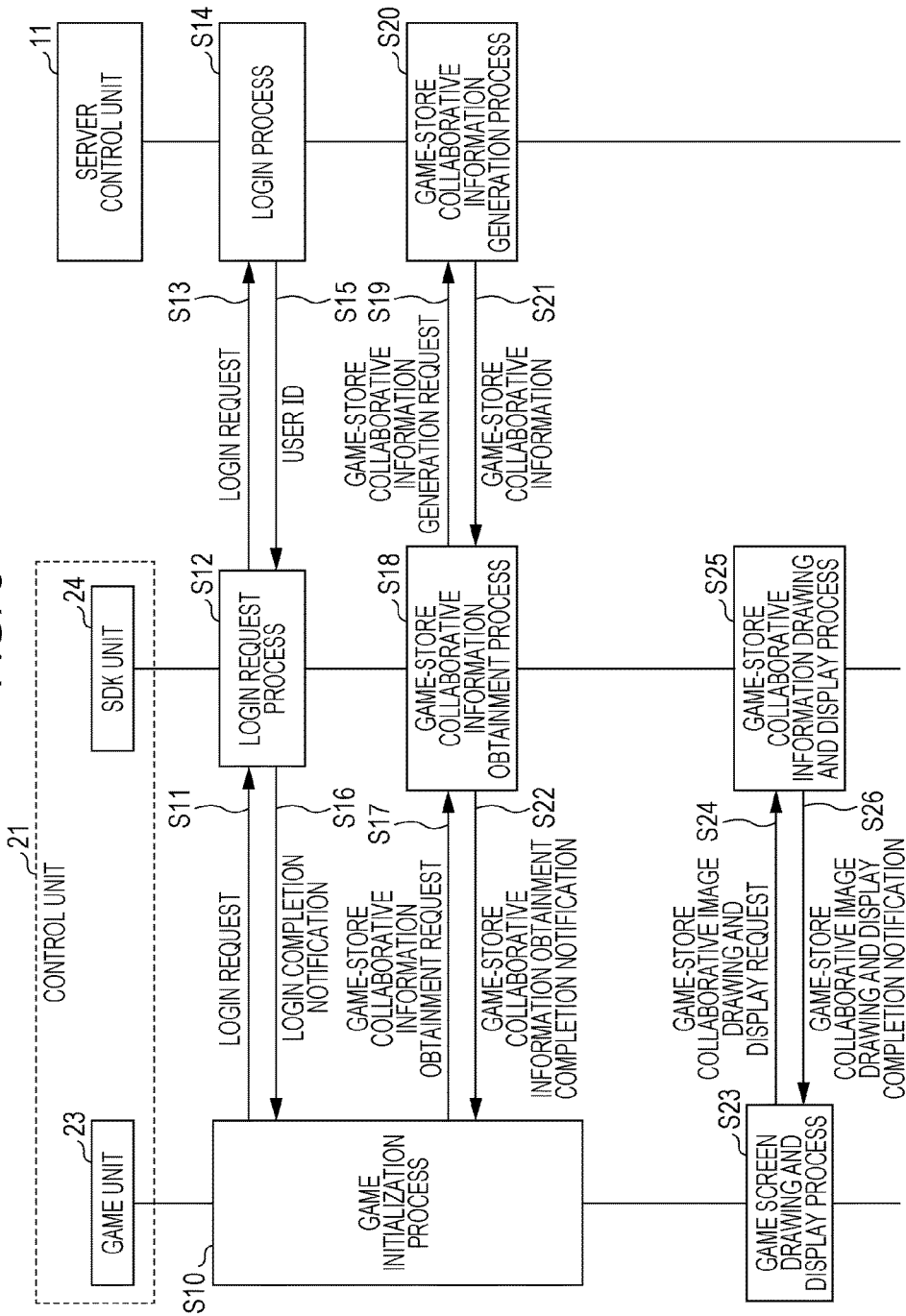
FIG. 6 is a sequence chart of an initialization process.

An initialization process at the time of execution of the game app in the mobile terminal 20 will be described. An overall flow of the initialization process will be described first. FIG. 6 is a sequence chart of the initialization process.

In a game initialization process (S10), the game unit 23 transmits a login request to the SDK unit 24 (S11). The SDK unit 24 performs a login request process (S12). Specifically, the SDK unit 24 transmits a login request to the server control unit 11 (S13).

The server control unit 11 performs a login process in response to the received login request (S14). After completion of the login process, the server control unit 11 transmits a user ID to the SDK unit 24 (S15). The SDK unit 24 transmits a login completion notification to the game unit 23 (S16).

Upon completion of login, the game unit 23 transmits a game-store collaborative information obtainment request to the SDK unit 24 (S17). The SDK unit 24 performs a game-store collaborative information obtainment process (S18). Specifically, the SDK unit 24 transmits a game-store collaborative information generation request to the server control unit 11 (S19).

The server control unit 11 performs a game-store collaborative information generation process in response to the received game-store collaborative information generation request (S20) and transmits a generated piece of game-store collaborative information to the SDK unit 24 (S21). The SDK unit 24 transmits a game-store collaborative information obtainment completion notification to the game unit 23 (S22).

With the above-described processes, the game initialization process (S10) is completed. Subsequently, the game unit 23 performs a game screen drawing and display process (S23). Subsequently, the game unit 23 transmits a game-store collaborative image drawing and display request to the SDK unit 24 (S24). The SDK unit 24 performs a game-store collaborative information drawing and display process (S25). After completion of the game-store collaborative information drawing and display process, the SDK unit 24 transmits a game-store collaborative image drawing and display completion notification to the game unit 23 (S26).

Figure 7:
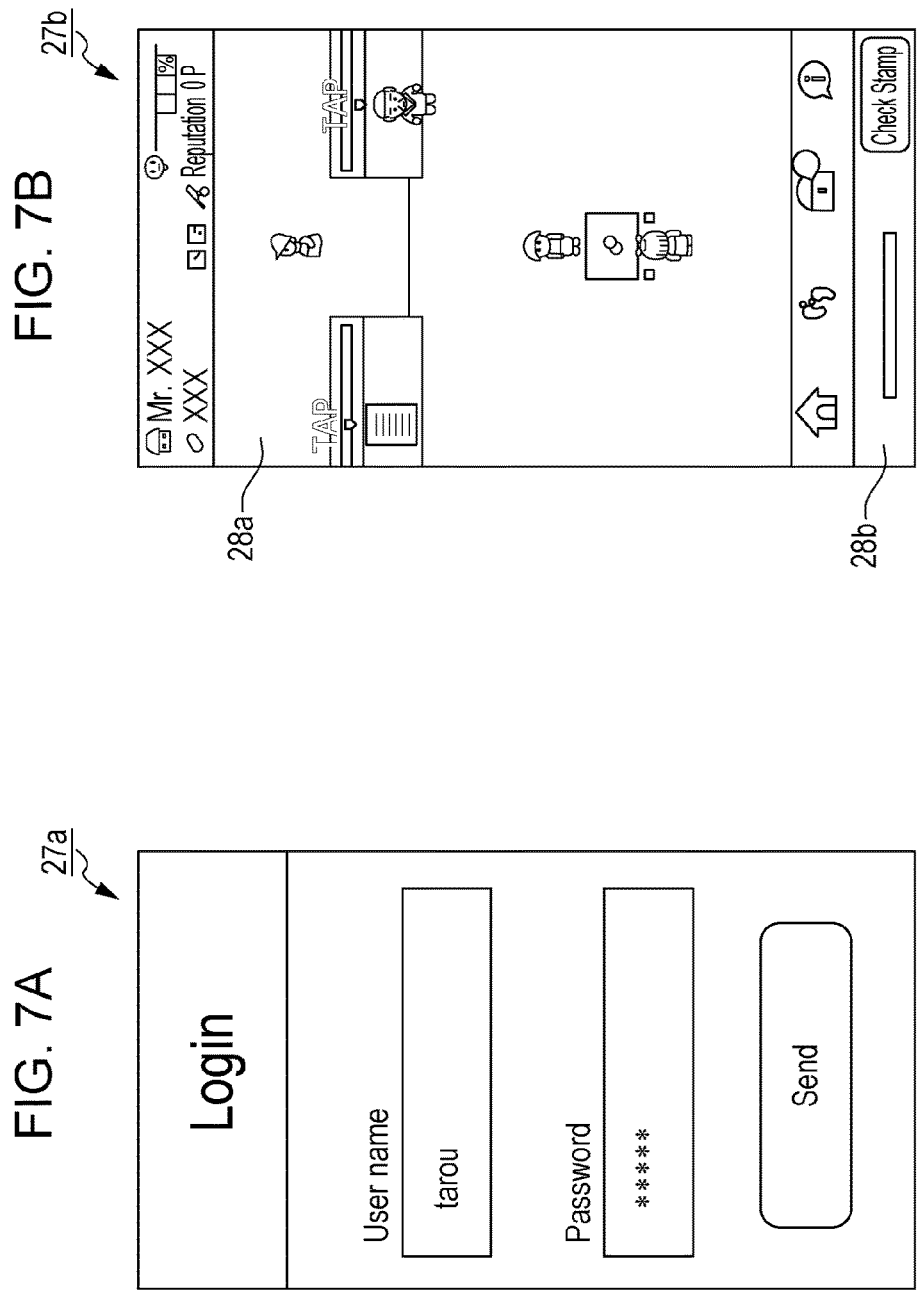
FIGS. 7A and 7B are views showing examples of a display screen to be displayed on a display unit of a mobile terminal.

Note that a login screen 27a as in FIG. 7A is displayed on the display unit of the mobile terminal 20 at the time of the login process. A game screen 27b as in FIG. 7B is displayed at the time of completion of the game screen drawing and display process. Note that the game screen 27b includes a game-specific image 28a and a game-store collaborative image 28b.

Figure 8:
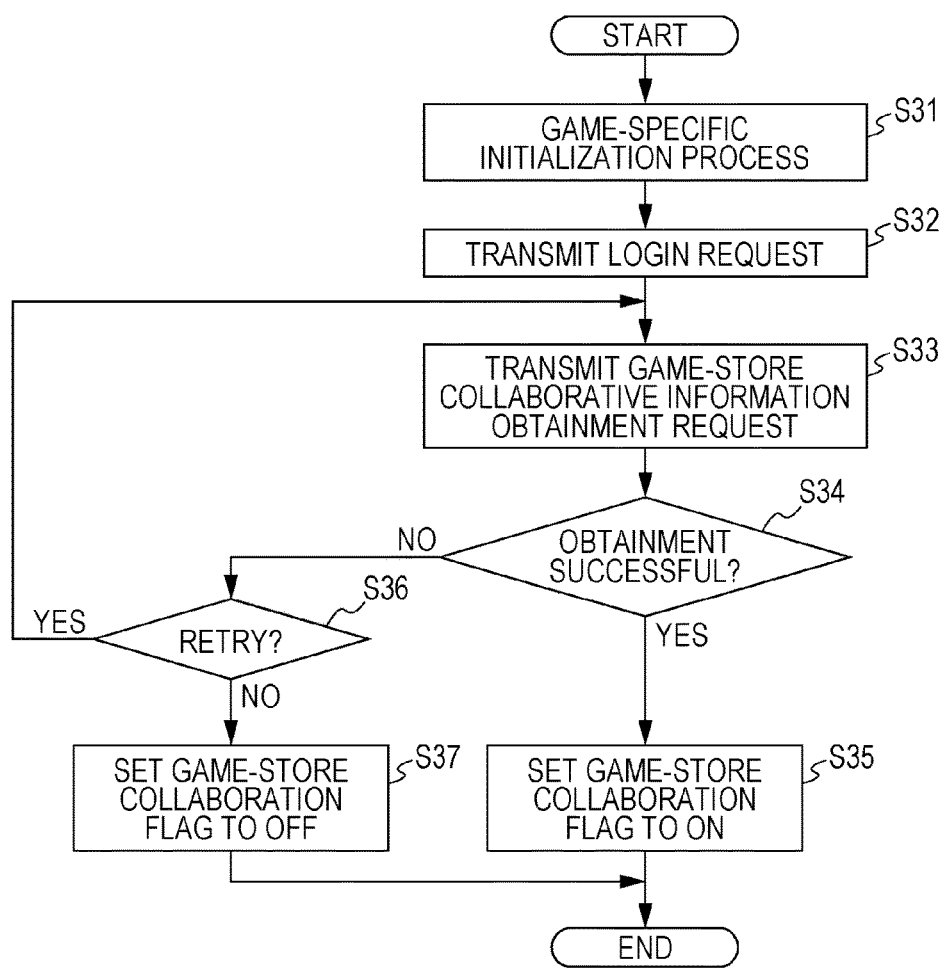
FIG. 8 is a flowchart of the operation of a game unit in the initialization process.

The details of the operation in the initialization process will be described. The operation of the game unit 23 in the initialization process will be described first. FIG. 8 is a flowchart of the operation of the game unit 23 in the initialization process.

As shown in FIG. 8, the game unit 23 performs a game-specific initialization process (S31). After that, the game unit 23 transmits a login request to the SDK unit 24 (S32) and transmits a game-store collaborative information obtainment request to the SDK unit 24 (S33). If the game unit 23 is successful in obtaining a piece of game-store collaborative information (YES in S34), the game unit 23 sets a game-store collaboration flag to ON (S35). On the other hand, if the game unit 23 is unsuccessful in obtaining a piece of game-store collaborative information (NO in S34), the game unit 23 makes a retry (YES in S36) and then sets the game-store collaboration flag to OFF (S37). Note that, for example, a predetermined number of retries are made.

Note that various processing requests after the operation (for example, a game-store collaborative information drawing and display request in FIG. 6) from the game unit 23 to the SDK unit 24 are made only when the game-store collaboration flag is ON.

Figure 9:
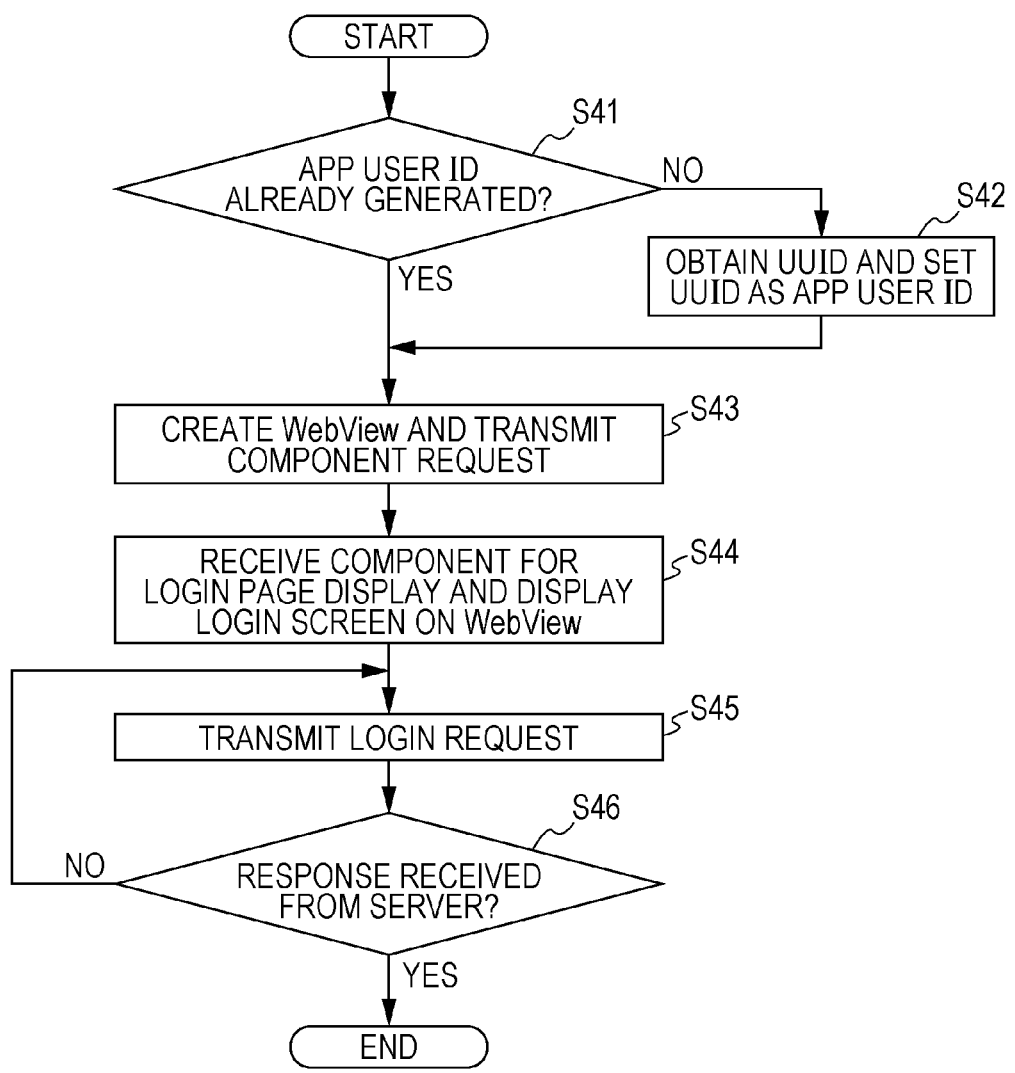
FIG. 9 is a flowchart of the operation of a SDK unit in the initialization process.

The operation of the SDK unit 24 in the initialization process will be described. FIG. 9 is a flowchart of the operation of the SDK unit 24 in the initialization process.

The SDK unit 24 first determines whether an app user ID is already generated (S41). If an app user ID is not already generated (NO in S41), the SDK unit 24 obtains a universally unique identifier (UUID) from the OS 26 and sets the obtained UUID as an app user ID (S42).

The SDK unit 24 creates a WebView and transmits a component request for login page display with the app user ID and an application ID as arguments to the server 10 (S43). Note that a WebView is a function of (mechanism for) displaying a Web page in an app (the game app here) of the mobile terminal 20 by the app.

The SDK unit 24 receives components for login page display from the server 10 and displays the login screen 27a on the WebView (S44). A user enters a user name and a password through the mobile terminal 20. That is, the SDK unit 24 obtains the user name and the password entered by the user.

The SDK unit 24 then transmits a login request with the user name and the password entered by the user, and the app user ID and the application ID as arguments to the server 10 (S45). If there is no response from the server 10 (NO in S46), the SDK unit 24 retransmits the login request. When a response from the server 10 is obtained (YES in S46), the process ends.

Specific examples of a component request, a login request, and responses to the requests will be described. FIGS. 10A to 10D and 11 are views showing examples of HTML documents for a component request, a login request, and responses to the requests.

As shown in FIG. 10A, a component request 29 includes an app user ID 29a, an application ID 29b, and an action 29c.

As shown in FIG. 10B, a login request 31 includes an app user ID 31a, an application ID 31b, an action 31c, a user name 31d, and a password 31e.

In response to the login request 31, the server 10 transmits a response 32b (a response indicating the absence of an error) shown in FIG. 10C (YES in step S46). Note that, in the case of a failure to log in with a combination of a user name and a password specified in the login request 31, the server 10 transmits a response 32c shown in FIG. 10D (NO is selected in step S46, and the process in step S45 is performed again).

Figure 11:
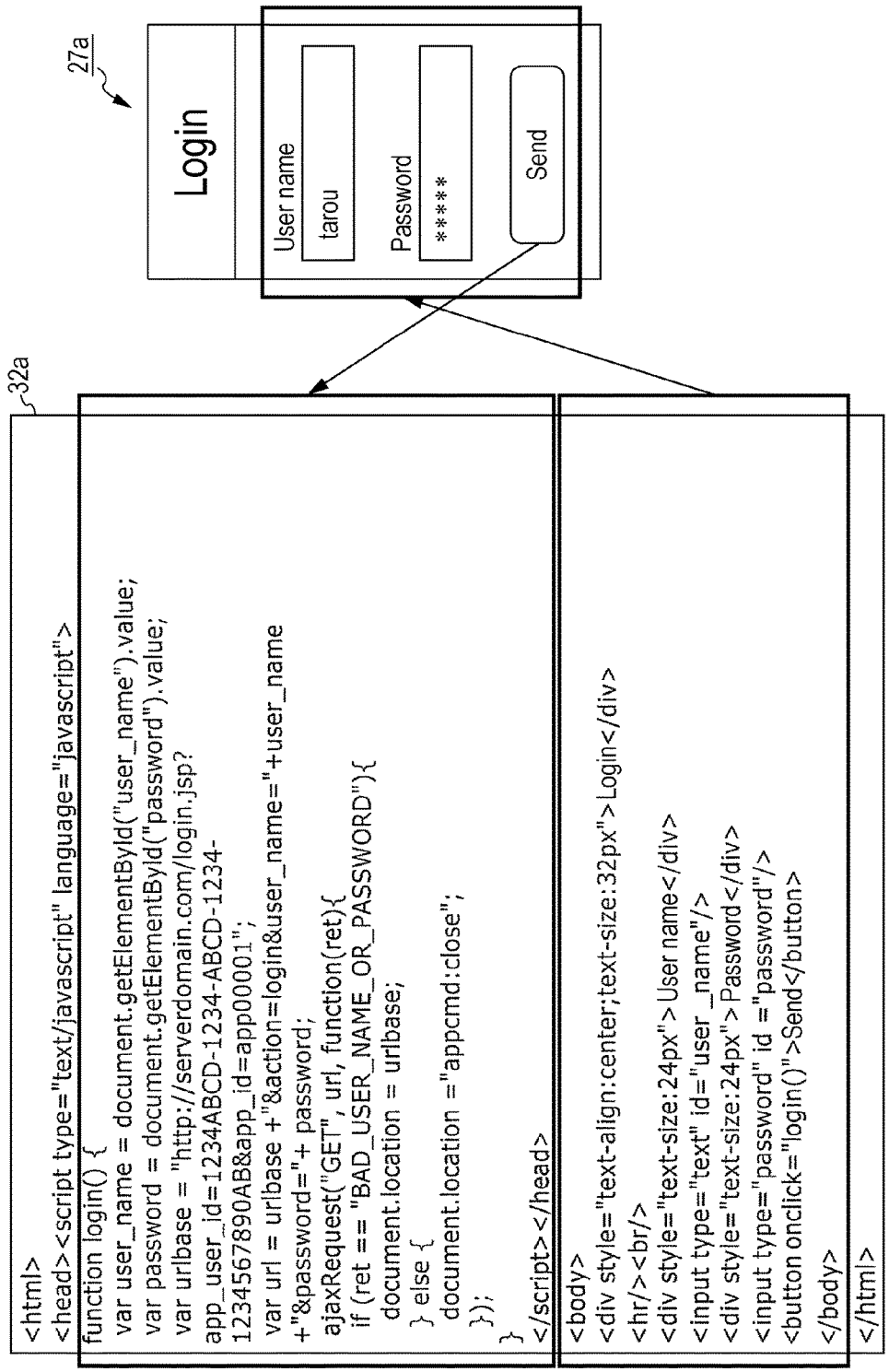
FIG. 11 is a view showing an example of an HTML document for a response to a component request.

Note that, to display the login screen, a response in HTML and JavaScript® format, like a response 32a shown in FIG. 11, is transmitted in response to the component request 29. That is, "components" for WebView display are transmitted in HTML and JavaScript® format. A first half (a portion enclosed in an upper box in FIG. 11) of the response 32a describes login request transmission processing and retry processing when a Send button is pressed on the mobile terminal 20. A second half (a portion enclosed in a lower box in FIG. 11) of the response 32a describes components for displaying the login screen 27a on the display unit of the mobile terminal 20.

Figure 12:
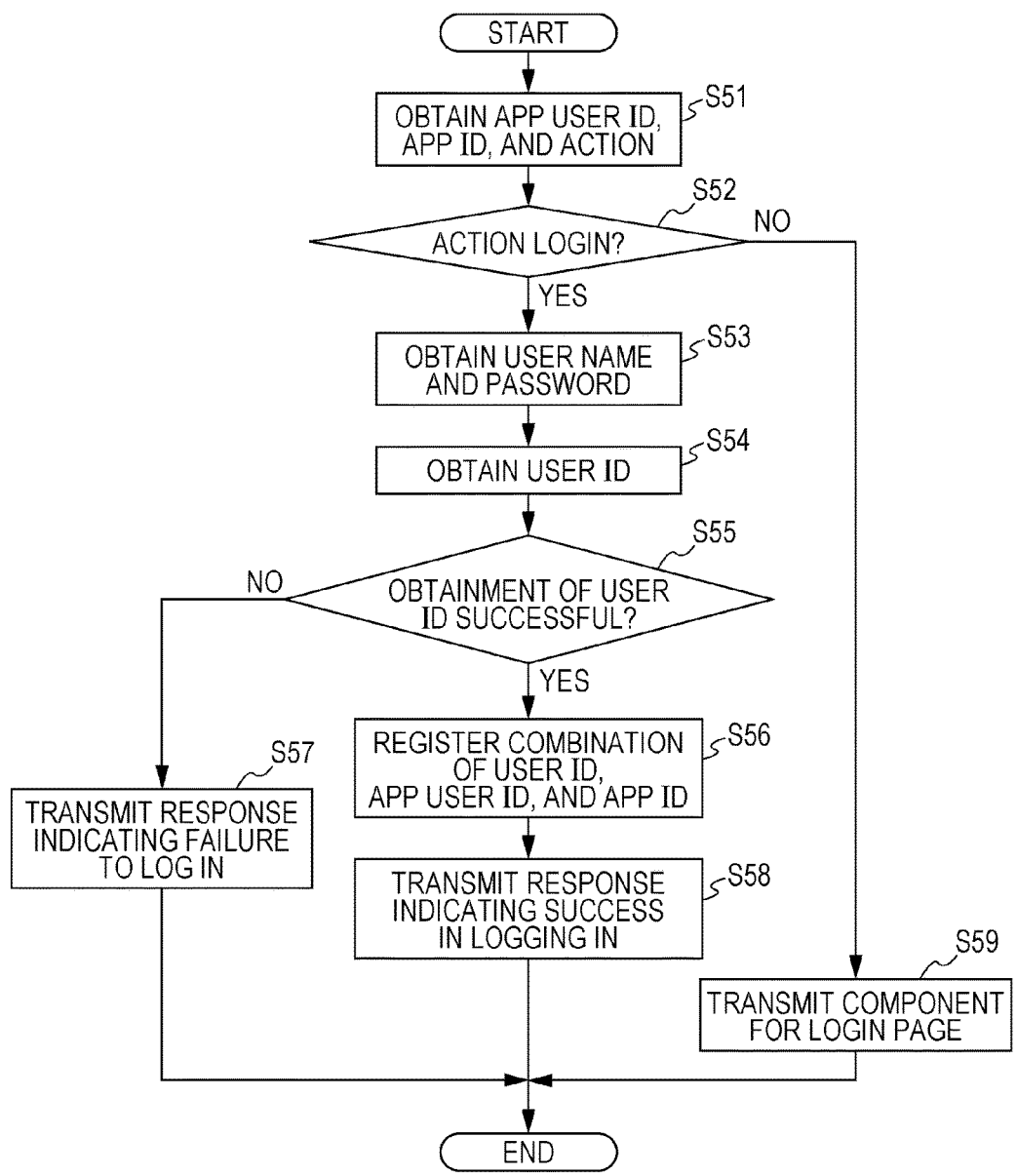
FIG. 12 is a flowchart of the operation of a server in the initialization process.

The operation of the server 10 (server control unit 11) will be described. FIG. 12 is a flowchart of the operation of the server 10 in the initialization process. FIGS. 13A to 13C are charts showing the user login information 151 and the user achievement information 152 in the user information DB 15. Note that a user ID 151a is associated with a user name and a password in the user login information 151, as shown in FIG. 13A. As shown in FIGS. 13B and 13C, a user ID 152a is associated with an app user ID, an application ID, a game score, a level 152d, a stamp sheet 152b, and the number 152c of stamps in each piece 152f of user achievement information included in the user achievement information 152.

The server control unit 11 obtains the app user ID 29a (or 31a), the application ID 29b (or 31b), and the action 29c (or 31c) from the component request 29 (or the login request 31) transmitted from the mobile terminal 20 (S51). If the action is "login", that is, if the login request 31 is transmitted from the mobile terminal 20 (YES in S52), the server control unit 11 obtains the user name 31d and the password 31e from the login request (S53). The server control unit 11 searches in the user login information 151 and obtains the user ID 151a (S54).

If the server control unit 11 is successful in obtaining the user ID 151a (YES in S55), and there is no combination of the user ID 151a, the app user ID 31a, and the application ID 31b in the user achievement information 152, the server control unit 11 registers a combination of the user ID 151a, the app user ID 31a, and the application ID 31b in the user achievement information 152 (S56). Note that values of elements other than a user ID, an app user ID, and an application ID are set to default values (for example, a score is set to 0, a level is set to 1, a stamp sheet is set to 1, and the number of stamps is set to 0). The server control unit 11 transmits the response 32b indicating a success in logging in to the mobile terminal 20, regardless of the presence or absence of registration in the user achievement information 152 (S58).

If the server control unit 11 is unsuccessful in obtaining a user ID (NO in S55), the server control unit 11 transmits the response 32c indicating a failure to log in to the mobile terminal 20 (S57).

If the action is "view" in step S52, that is, if the component request 29 is transmitted from the mobile terminal 20 (NO in S52), the server control unit 11 generates the response 32a on the basis of the app user ID 29a and the application ID 29b and transmits the response 32a to the mobile terminal 20 (S59).

[Process of Generating Game-Store Collaborative Information]

Figure 14:
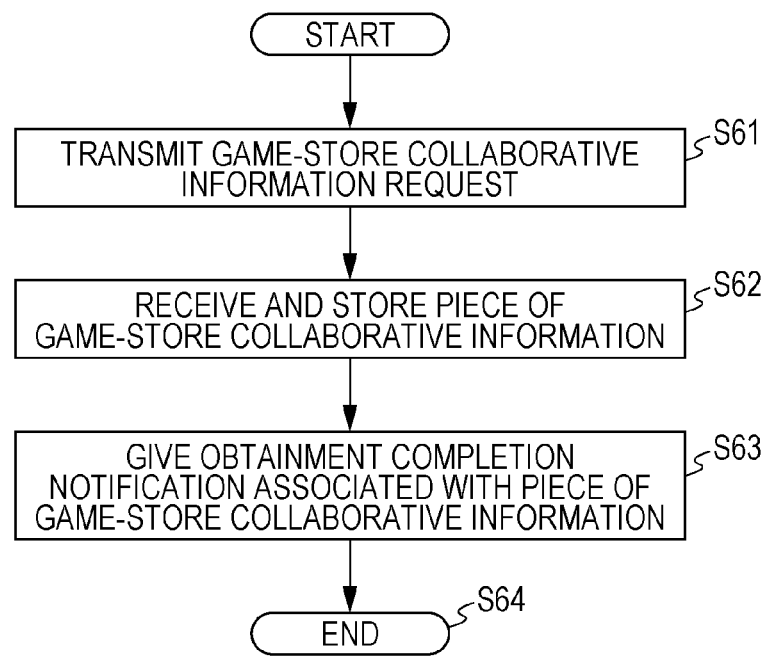
FIG. 14 is a flowchart of a method for obtaining a piece of game-store collaborative information.

The process of generating a piece of game-store collaborative information of the game initialization process will be described. A method for obtaining a piece of game-store collaborative information by the SDK unit 24 will be described first. FIG. 14 is a flowchart of the method for obtaining a piece of game-store collaborative information.

Figure 15A:
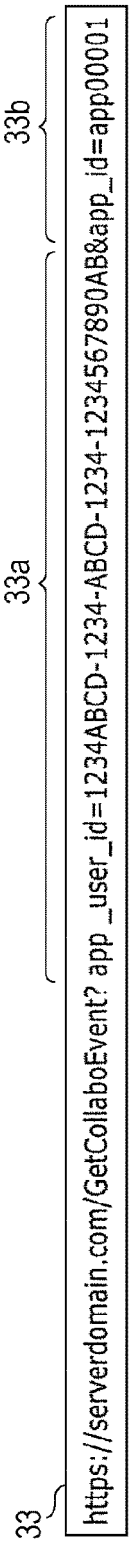
FIGS. 15A and 15B are views showing examples of a game-store collaborative information request and a piece of game-store collaborative information.
Figure 15B:
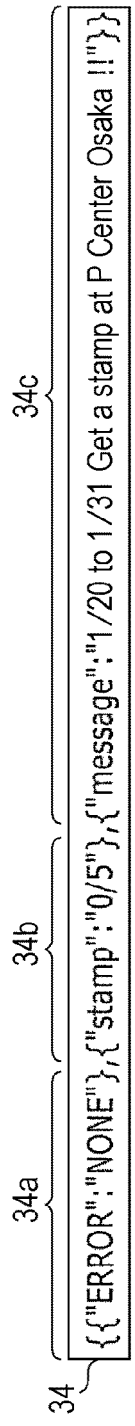
Figures 16, 17:
FIG. 16 is a chart showing an example of server information in the server information DB.
FIG. 17 is a view showing an example of a stamp sheet screen.

FIGS. 15A and 15B are charts showing examples of a game-store collaborative information request (FIG. 15A) and a piece of game-store collaborative information (FIG. 15B). FIG. 16 is a chart showing an example of server information in the server information DB 25. FIG. 17 is a view showing an example of a stamp sheet screen.

The SDK unit 24 transmits a game-store collaborative information request 33 with an app user ID 33a and an application ID 33b as arguments (S61). The SDK unit 24 receives a piece 34 of game-store collaborative information from the server control unit 11 and stores the piece 34 of game-store collaborative information as server information 35 (S62). The SDK unit 24 gives an obtainment completion notification associated with the piece 34 of game-store collaborative information to the game unit 23 (S63).

Note that the piece 34 of game-store collaborative information is a piece of information for generating a game-store collaborative image and includes a response 34a, the number 34b of stamps, and a message 34c. The server information 35 also includes such pieces of information.

The response 34a is a piece of information indicating whether the server control unit 11 is successful in generating the piece 34 of game-store collaborative information (whether an error has occurred). The response 34a has the description "NONE" if the server control unit 11 is successful in generating the piece 34 of game-store collaborative information, the description "connection_error" if the SDK unit 24 is unsuccessful in network connection to the server control unit 11, and the description "bad_app_id" if the application ID is not registered in the server.

The number 34b of stamps is a piece of information indicating the progress of stamp acquisition for an app user identified by an app user ID in a game identified by an application ID. In the first embodiment, the number 34b of stamps is expressed as (the number of acquired stamps/a goal stamp number). Note that the goal stamp number is the number of stamps needed to fill a stamp sheet and is set to "5" in the first embodiment. Thus, if no stamp is imprinted, as in a stamp sheet screen 27c shown in FIG. 17, the number 34b of stamps is expressed as "0/5".

The message 34c is a message which is generated by the server control unit 11 to promote a visit to the store 30.

Figure 18:
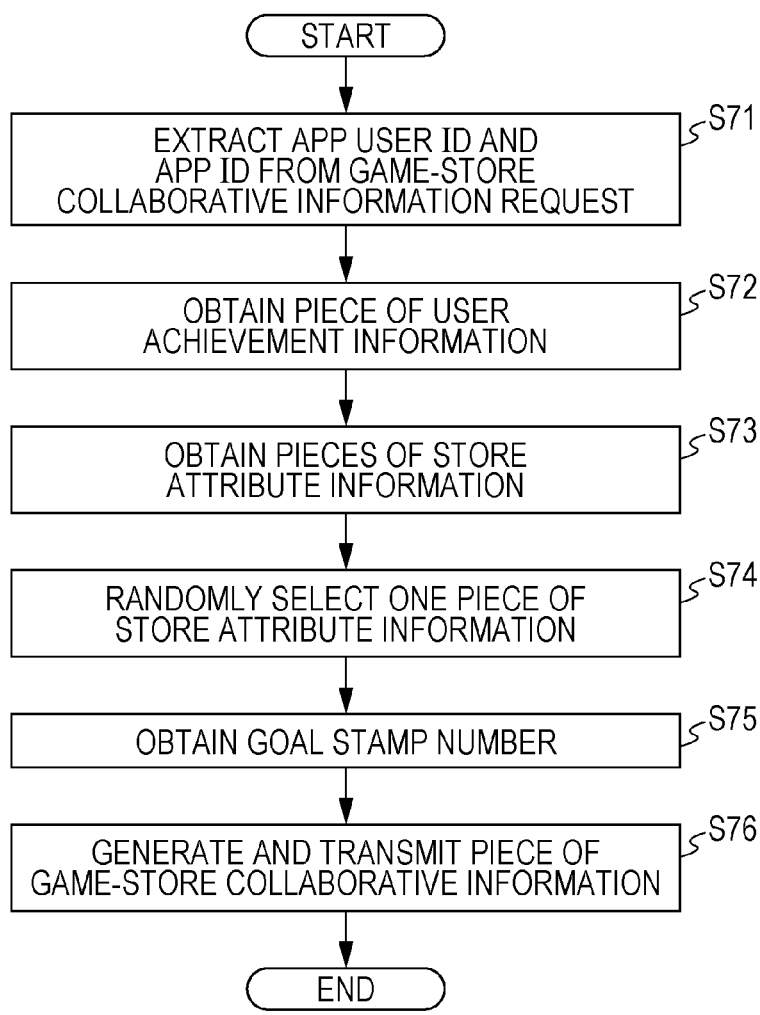
FIG. 18 is a flowchart of a method for generating a piece of game-store collaborative information.

The process of generating the piece 34 of game-store collaborative information by the server 10 (server control unit 11) will be described. FIG. 18 is a flowchart of a method for generating the piece 34 of game-store collaborative information. FIG. 19 is a chart showing an example of the store attribute information 131 in the store information DB 13. FIG. 20 is a chart showing an example of the stamp information 141 in the game app information DB 14.

The server control unit 11 extracts the app user ID 33a and the application ID 33b from the game-store collaborative information request 33 received from the control unit 21 (SDK unit 24) (S71). The server control unit 11 acquires the corresponding piece 152f of user achievement information from the user information DB 15 on the basis of the extracted app user ID 33a and application ID 33b (S72).

The server control unit 11 then obtains a fixed number of pieces of the store attribute information 131 (FIG. 19) from the store information DB 13 (S73) and randomly selects one of the pieces of the store attribute information 131 (S74). Note that the details of the process in step S73 will be described later.

The server control unit 11 obtains a goal stamp number for a stamp sheet ordinal number of the app corresponding to the application ID 33b from the stamp information 141 in the game app information DB 14 (S75). The stamp sheet ordinal number is identified by the stamp sheet 152b included in the piece 152f of user achievement information and is "2" here. As indicated by a piece 141a of stamp information in FIG. 20, the goal stamp number is "5".

Finally, the server control unit 11 generates the piece 34 of game-store collaborative information including the number of acquired stamps identified by the number 152c of stamps included in the piece 152f of user achievement information, the goal stamp number described above, and a message included in the piece of game-store collaborative information selected in step S74 described above (for example, a message 36f if a piece 131d of store attribute information is selected in step S74) and transmits the piece 34 of game-store collaborative information to the mobile terminal 20 (S76).

Figure 21A:
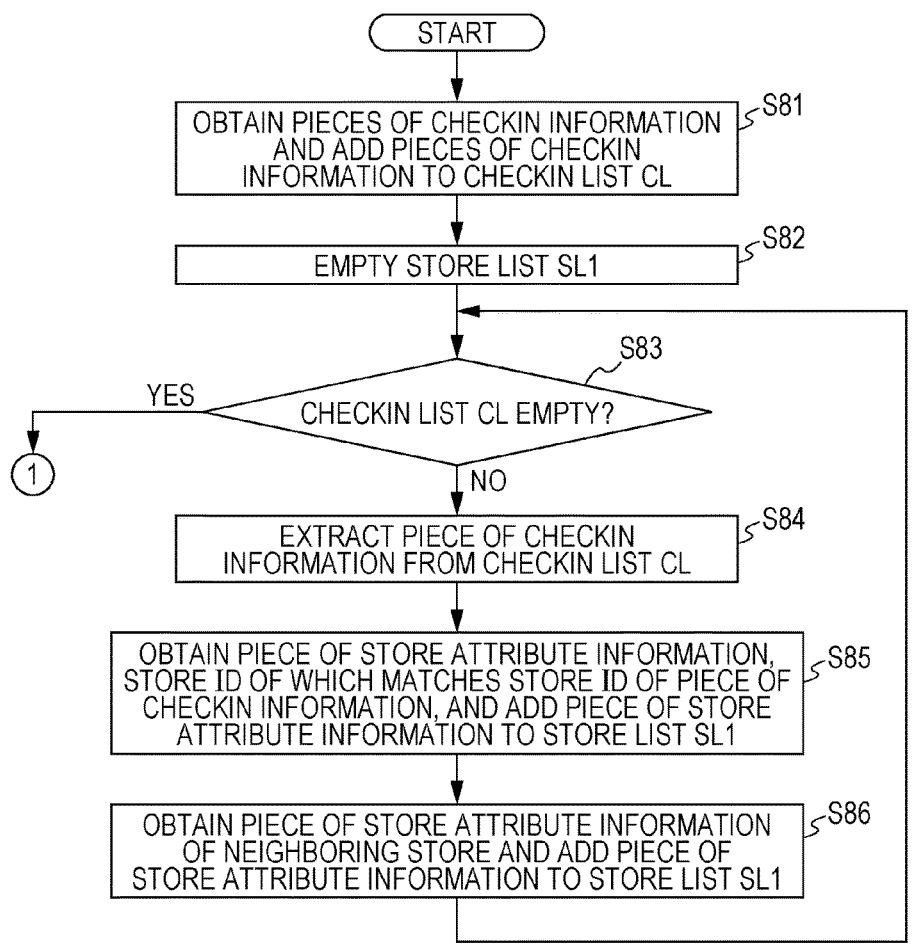
FIG. 21A is a flowchart (first half) of a process of obtaining a fixed number of pieces of store attribute information from the store information DB.
Figure 21B:
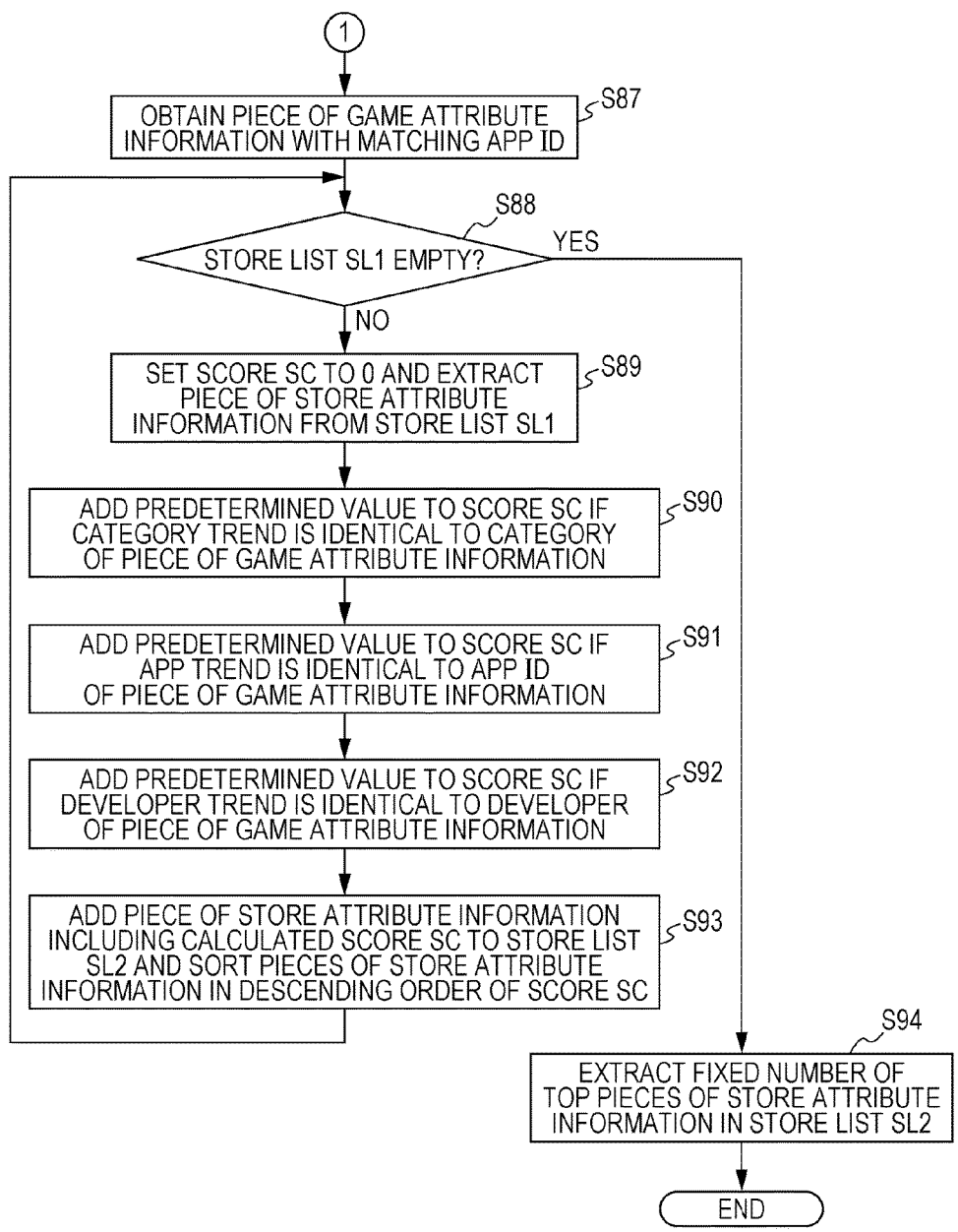
FIG. 21B is a flowchart (second half) of the process of obtaining the fixed number of pieces of store attribute information from the store information DB.
Figure 22A:
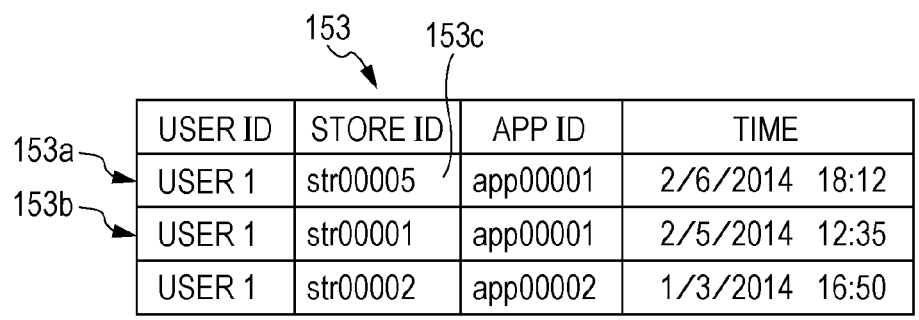
FIGS. 22A and 22B are charts showing examples of a user checkin log and game attribute information.
Figure 22B:
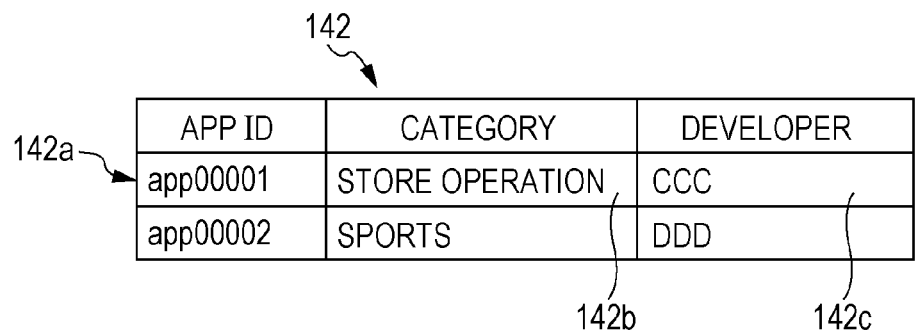

An example of the process of obtaining the fixed number of pieces of the store attribute information 131 from the store information DB 13 (the process in step S73 described above) will be described. FIGS. 21A and 21B are flowcharts of the process of obtaining the fixed number of pieces of the store attribute information 131 from the store information DB 13. FIGS. 22A and 22B are charts showing examples of the user checkin log 153 (FIG. 22A) and the game attribute information 142 (FIG. 22B).

Note that an example will be described below in which the server control unit 11 extracts the fixed number of pieces of the store attribute information 131 using a checkin list CL, store lists SL1 and SL2, and a score SC.

The server control unit 11 obtains pieces of checkin information for a fixed period (a history of checkins; pieces 153a and 153b of checkin information in FIG. 22A, times of which fall within the range of Jan. 7, 2014 12:00 PM to Feb. 7, 2014 12:00 PM, for example, if the fixed period is one month, and the current date and time is Feb. 7, 2014 12:00 PM) from the user checkin log 153 in the user information DB 15 and adds the pieces of checkin information to the checkin list CL (S81). The server control unit 11 empties the store list SL1 (S82) and judges whether the checkin list CL is empty (S83).

If the checkin list CL is not empty (NO in S83), the server control unit 11 extracts one piece of checkin information from the checkin list CL (S84). The server control unit 11 refers to the store attribute information 131, obtains a piece of the store attribute information 131 which has a store ID matching a store ID of the piece of checkin information, and adds the piece of the store attribute information 131 to the store list SL1 (S85). For example, if the piece 153a of checkin information in FIG. 22A is extracted, a store ID 153c is str00005, and a piece 131e of store attribute information of the store attribute information 131 in FIG. 19 is obtained.

The server control unit 11 refers to the store attribute information 131, obtains a piece of the store attribute information 131 for a store neighboring a store indicated by the store ID 153c of the piece of checkin information, and adds the piece of the store attribute information 131 to the store list SL1 (S86). Note that a judgment about the presence or absence of a store neighboring the store is made by using a latitude and a longitude included in the piece of store attribute information to calculate the distance between the stores. Specifically, if the distance between the stores is not more than a fixed value (for example, 500 m), the store is judged as a neighboring store. To search for a piece of the store attribute information 131 belonging to an area within 500 m of the store in its neighborhood, using SQL, the description as in FIG. 23 is given. For example, pieces of store attribute information having pieces of latitude and longitude information within 500 m of the piece 131e of store attribute information (having a latitude of 34.72101 and a longitude of 135.3122) are pieces 131b and 131d of store attribute information. In this case, the pieces 131b and 131d of store attribute information are added to the store list SL1.

The processes in step S84 to step S86 are performed until the checkin list CL is empty (YES in S83).

The server control unit 11 obtains a piece of game attribute information (a piece 142a of game attribute information here), an application ID of which matches the application ID 33b included in the game-store collaborative information request 33, from the game attribute information 142 in the game app information DB 14 (S87).

If the store list SL1 is not empty (NO in S88), the server control unit 11 sets a score SC to 0 and extracts one piece of the store attribute information 131 from the store list SL1 (S89). If a category trend of the extracted piece of the store attribute information 131 (hereinafter also referred to as a piece in question of the store attribute information 131) is identical to a category 142b of a piece 142a of game attribute information, the server control unit 11 adds a predetermined value (a numerical value in brackets of a category trend of each piece of the store attribute information 131; 0.5, for example, in the case of the piece 131d of store attribute information) to the score SC for the piece in question of the store attribute information 131 (S90).

If an app trend of the piece in question of the store attribute information 131 is identical to the application ID 33b included in the game-store collaborative information request 33, the server control unit 11 adds a predetermined value (a numerical value in brackets of an app trend of each piece of the store attribute information 131; 0.2, for example, in the case of the piece 131a of store attribute information) to the score SC for the piece in question of the store attribute information 131 (S91).

If a developer of the piece in question of the store attribute information 131 is identical to a developer 142c of the piece 142a of game attribute information, the server control unit 11 adds a predetermined value (a numerical value in brackets of a developer trend of each piece of the store attribute information 131; 0.3, for example, in the case of the piece 131b of store attribute information) to the score SC for the piece in question of the store attribute information 131 (S92).

Finally, the server control unit 11 includes the score SC calculated in steps S90 to S92 in the piece in question of the store attribute information 131 and adds the piece in question of the store attribute information 131 to the store list SL2. The server control unit 11 sorts pieces of the store attribute information 131 in the store list SL2 in descending order of score SC (S93).

The processes in steps S89 to S93 are performed for each piece of the store attribute information 131 in the store list SL1 until the store list SL1 is empty (YES in S88).

With the above-described processes, the fixed number of top pieces of the store attribute information 131 in the store list SL2, that is, the fixed number of stores, which neighbor stores visited by a player during a past fixed period and are highly relevant to the game app currently played by the player, are extracted (S94).

[Game Screen Drawing and Display Process]

Figure 24:
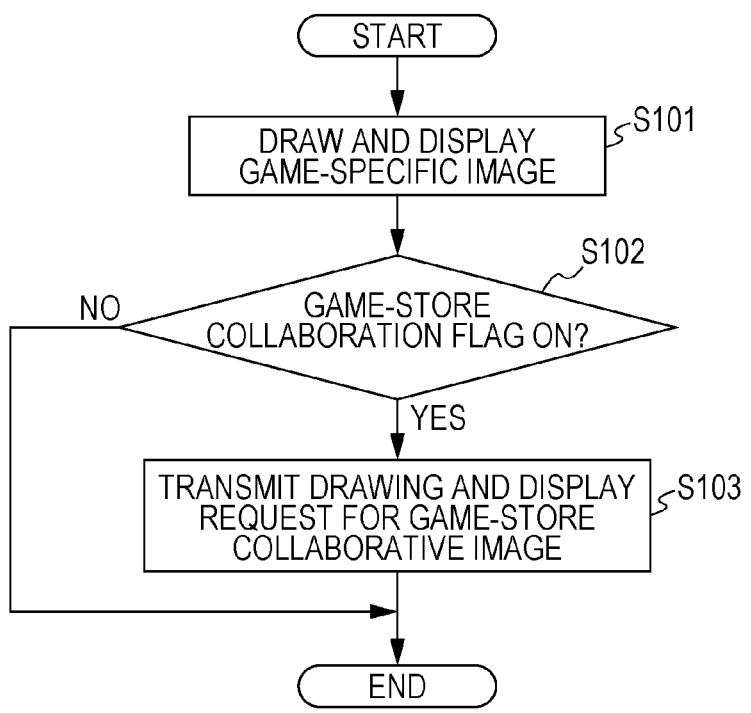
FIG. 24 is a flowchart of a game screen drawing and display process.
Figure 25:
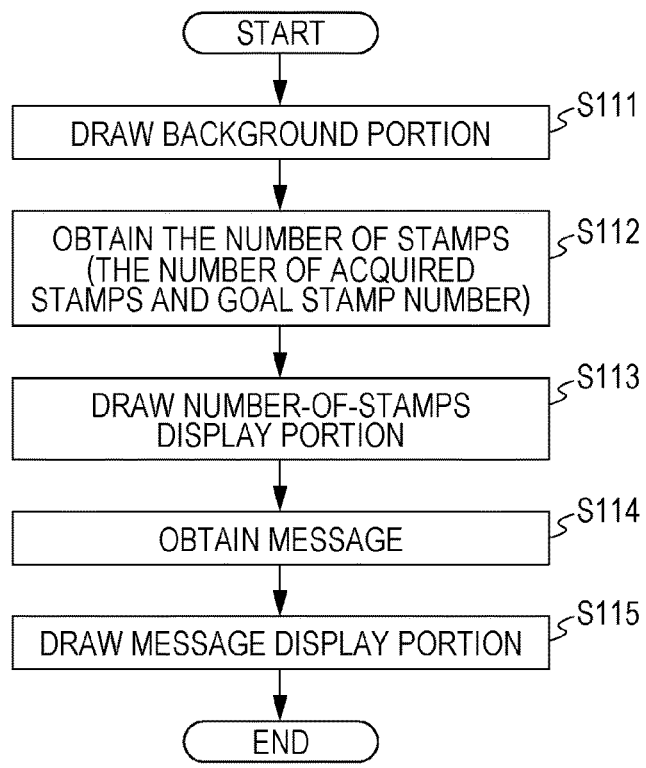
FIG. 25 is a flowchart of a process of generating a game-store collaborative image.
Figure 26:
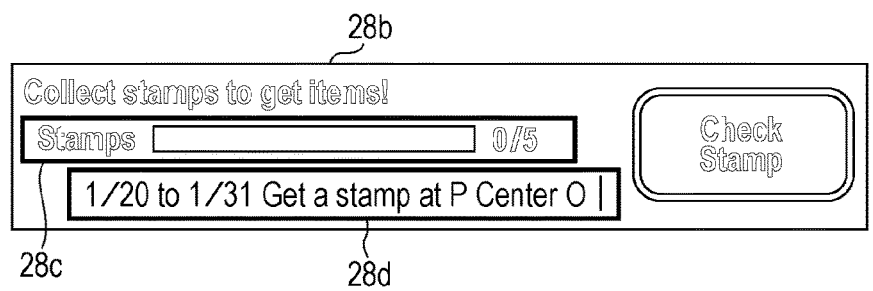
FIG. 26 is a view showing an example of a game-store collaborative image.

The game screen drawing and display process using the piece 34 of game-store collaborative information as described above will be described. FIG. 24 is a flowchart of the game screen drawing and display process. FIG. 25 is a flowchart of a process of generating the game-store collaborative image 28b. FIG. 26 is a view showing an example of the game-store collaborative image 28b.

As shown in FIG. 24, the game unit 23 first draws and displays the game-specific image 28a (S101). If the game-store collaboration flag is ON (YES in S102), the game unit 23 transmits a drawing and display request for the game-store collaborative image 28b to the SDK unit 24 (S103).

As shown in FIG. 25, the SDK unit 24 having received the drawing and display request for the game-store collaborative image 28b first draws a background portion of the game-store collaborative image 28b (FIG. 26) (S111). The SDK unit 24 then obtains the number 34b of stamps (the number of acquired stamps and a goal stamp number) from the piece 34 of game-store collaborative information (S112) and draws a number-of-stamps display portion 28c of the game-store collaborative image 28b (S113).

The SDK unit 24 further obtains the message 34c from the piece 34 of game-store collaborative information (S114) and draws a message display portion 28d of the game-store collaborative image 28b (S115). Note that the message 34c is scrolled and displayed in the message display portion 28d.

[Game Process and Reward Provision Process]

Figure 27:
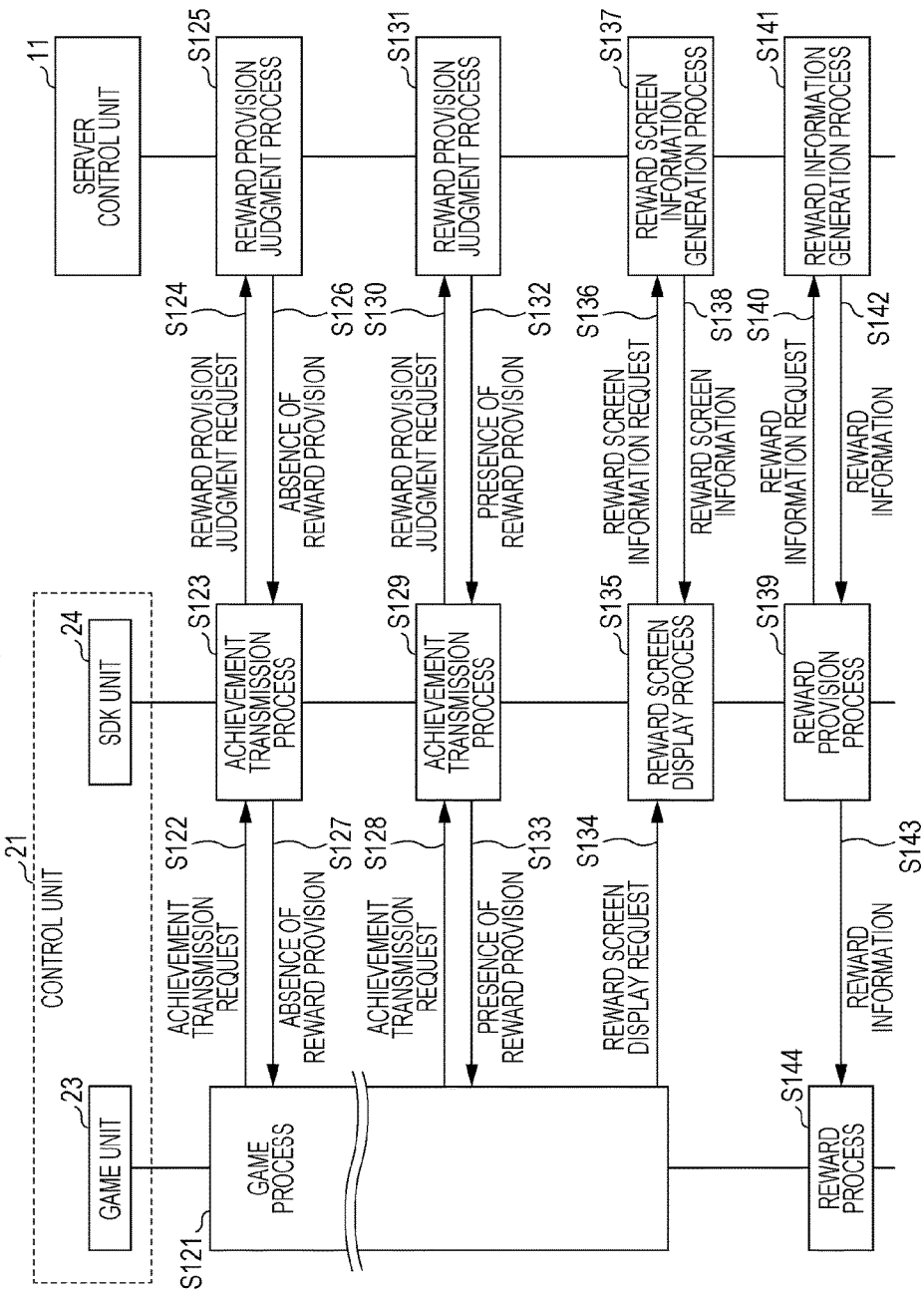
FIG. 27 is a sequence chart of a game process and a reward provision process.

A game process and a reward provision process will be described. FIG. 27 is a sequence chart of the game process and the reward provision process.

In the game process in S121, the game unit 23 transmits an achievement transmission request to the SDK unit 24 (S122). The SDK unit 24 having received the achievement transmission request performs an achievement transmission process (S123). Specifically, the SDK unit 24 transmits a reward provision judgment request to the server control unit 11 (S124). Note that the reward provision judgment request includes an achievement.

The server control unit 11 performs a reward provision judgment process on the basis of the transmitted reward provision judgment request (S125). If the server control unit 11 judges that reward provision is unnecessary, a response indicating the absence of reward provision (a piece of reward provision information) to the SDK unit 24 (S126). The SDK unit 24 transmits a response indicating the absence of reward provision (a piece of reward provision information) to the game unit 23 (S127).

In a case where reward provision is to be performed as well, the game unit 23 transmits an achievement transmission request to the SDK unit 24 (S128), and the SDK unit 24 performs the achievement transmission process (S129 and S130). The server control unit 11 performs the reward provision judgment process on the basis of the transmitted reward provision judgment request (S131) and, if the server control unit 11 judges that reward provision is necessary, transmits a response indicating the presence of reward provision (a piece of reward provision information) to the SDK unit 24 (S132). The SDK unit 24 transmits a response indicating the presence of reward provision to the game unit 23 (S133).

The game unit 23 having received the response indicating the presence of reward provision transmits a reward screen display request to the SDK unit 24 (S134). The SDK unit 24 having received the reward screen display request performs a reward screen display process (S135). Specifically, the SDK unit 24 transmits a reward screen information request to the server control unit 11 (S136). The server control unit 11 having received the reward screen information request generates a piece of reward screen information (S137) and transmits the generated piece of reward screen information to the SDK unit 24 (S138). The SDK unit 24 produces a display saying that a reward is acquired, using the received piece of reward screen information, on the display unit of the mobile terminal 20.

After the piece of reward screen information is displayed, the SDK unit 24 performs a reward provision process (S139). Specifically, the SDK unit 24 transmits a reward information request to the server control unit 11 (S140). The server control unit 11 having received the reward information request generates a piece of reward information (S141) and transmits the generated piece of reward information to the SDK unit 24 (S142).

The SDK unit 24 transmits the received piece of reward information to the game unit 23 (S143), and the game unit 23 performs a reward process (S144).

Figure 28:
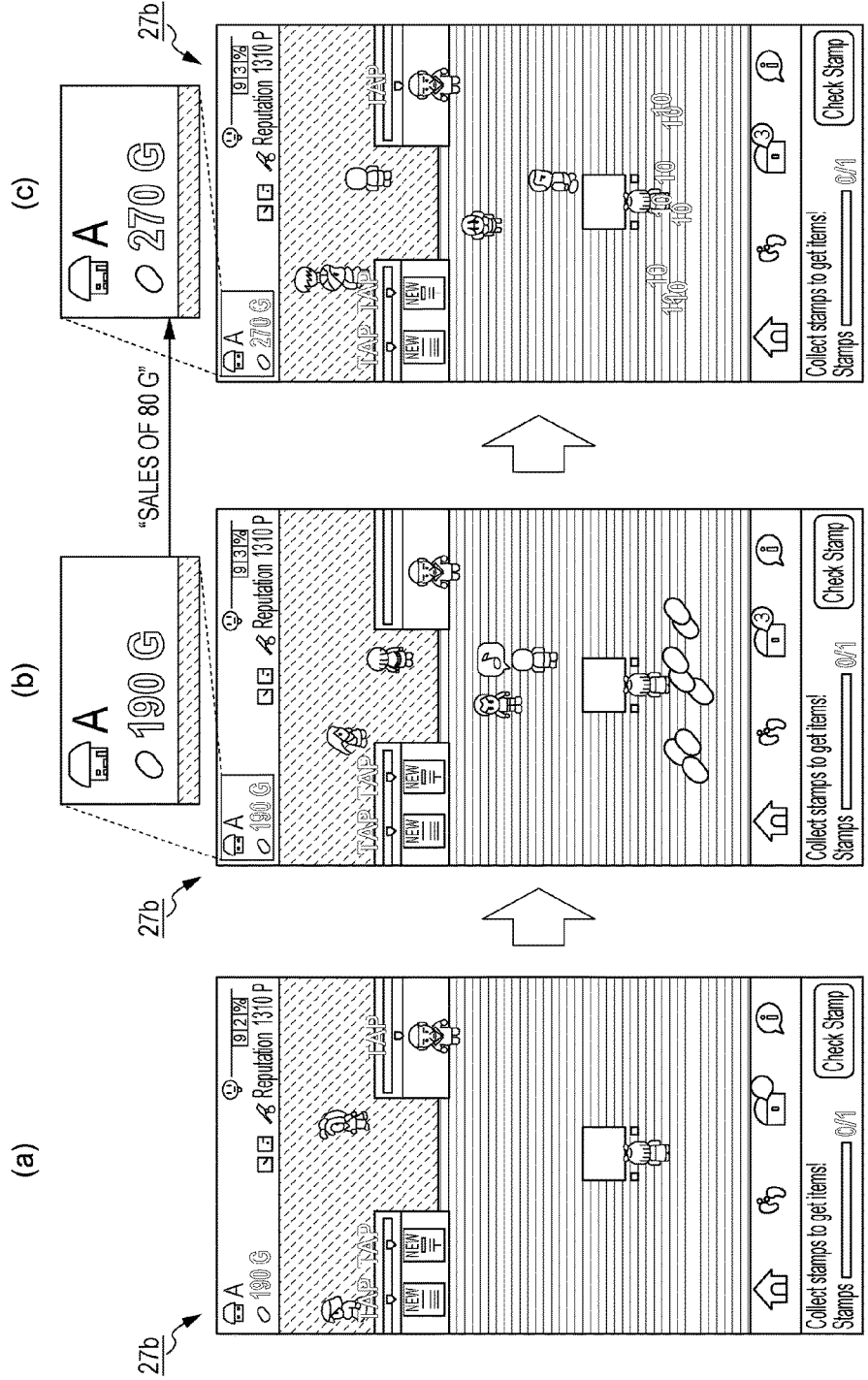
FIG. 28 is a view showing a game screen when merchandise is sold in a game.

As described above, in the game according to the first embodiment, a user sells merchandise in the game. When the sales of the merchandise reach a predetermined amount, a stamp is given. FIG. 28 is a view showing the game screen 27b when the merchandise is sold in the game.

As shown in part (a) of FIG. 28, the sales are shown at the upper left of the game screen. If the merchandise is sold in the game when the sales are "190 G" (G is the monetary unit in the game), as shown in part (b) of FIG. 28, the sales increase, as shown in part (c) of FIG. 28. In this example, "80 G" is added, and the sales increase to "270 G". This increase in the sales is included as an "achievement" in the achievement transmission request described above and is transmitted from the game unit 23 to the SDK unit 24. The achievement is also included in the reward provision judgment request described above and is transmitted from the SDK unit 24 to the server control unit 11.

Figure 29:
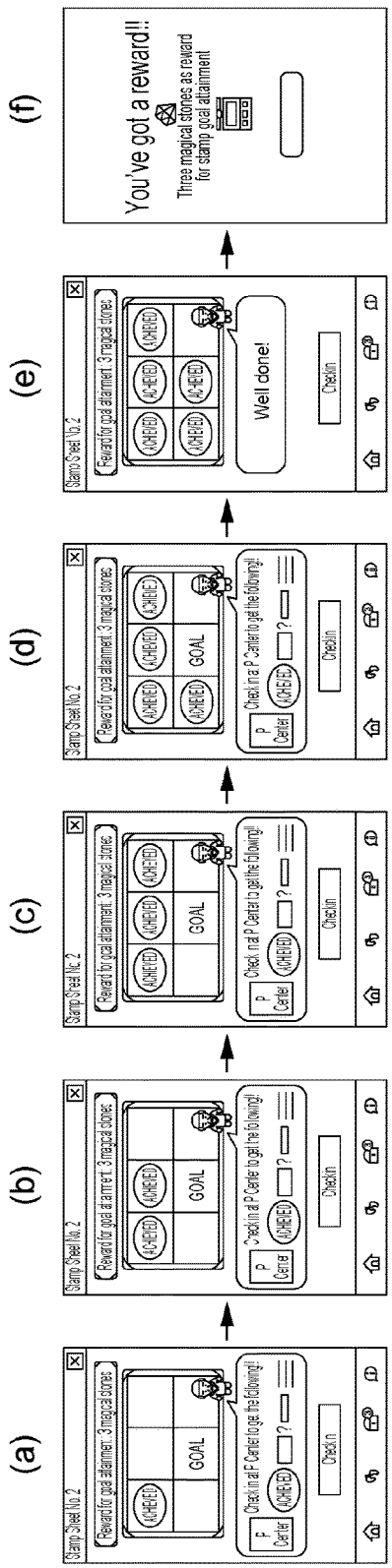
FIG. 29 is a view showing how stamps are imprinted on a stamp sheet screen.

Provision of a stamp corresponding to the achievement described above, that is, a process of adding a stamp on the stamp sheet screen 27c described above is included in the reward provision judgment process described above. (Note that a process of displaying a stamp sheet is included in the reward screen display process.) FIG. 29 is a view showing how stamps are imprinted on the stamp sheet screen 27c.

As shown in parts (a) to (e) of FIG. 29, in the reward provision judgment process, one stamp is provided as a reward every time a fixed achievement is made in the game. Screens indicating how stamps are imprinted on the stamp sheet screen 27c one by one are generated by the reward screen information generation process. A stamp is a piece of reward information managed by the server 10, and the game unit 23 need not be conscious of the number of acquired stamps and a goal stamp number. When the number of acquired stamps reaches the goal stamp number (five in this example), a valuable item is provided to a user in the game, as shown in part (f) of FIG. 29.

An item to be provided to a user here is a piece of information which needs to be provided by the game unit 23, unlike a stamp. Although a display associated with item provision is produced by the reward screen information generation process, a process of reflecting a provided item in the game is performed through the reward process by the game unit 23 having received a piece of reward information transmitted from the SDK unit 24.

Figure 30:
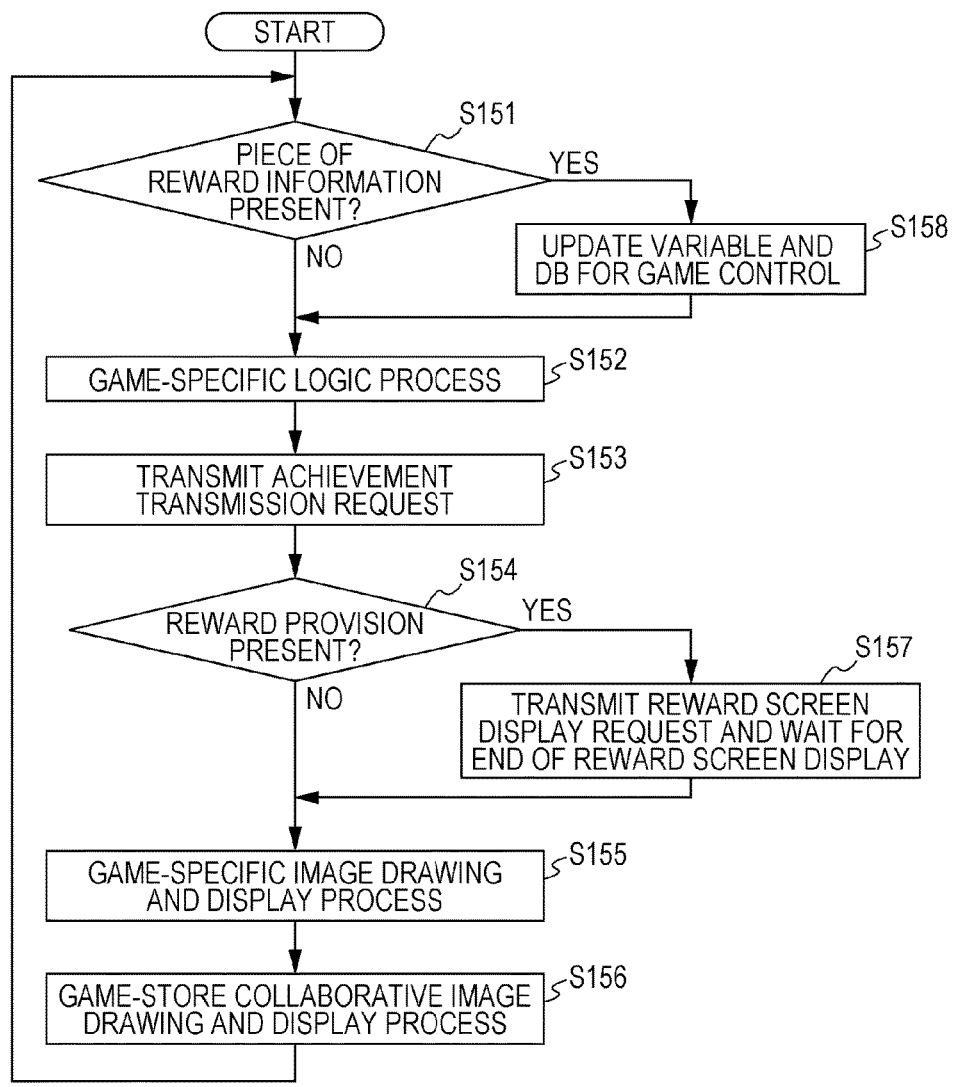
FIG. 30 is a flowchart of the game process and the reward provision process.

The game process and the reward process will be described in detail with reference to a flowchart. FIG. 30 is a flowchart of the game process and the reward process.

If the game unit 23 has received a piece of reward information from the SDK unit 24, that is, has a piece of reward information (YES in S151), the game unit 23 updates a variable and a DB for game control in accordance with the piece of reward information (S158).

If the game unit 23 has no piece of reward information (NO in S151) or after the process in step S158, the game unit 23 performs a game-specific logic process (S152). The game unit 23 transmits an achievement transmission request to the SDK unit 24 (S153).

If the game unit 23 receives a response indicating the presence of reward provision (YES in S154), the game unit 23 transmits a reward screen display request to the SDK unit 24 and waits for the end of reward screen display (S157).

If the game unit 23 receives a response indicating the absence of reward provision (NO in S154) or after the end of the reward screen display, the game unit 23 performs a game-specific image drawing and display process (S155), and the SDK unit 24 performs a game-store collaborative image drawing and display process (S156). The determination of the presence or absence of a piece of reward information (S151) is made again.

Figure 31:
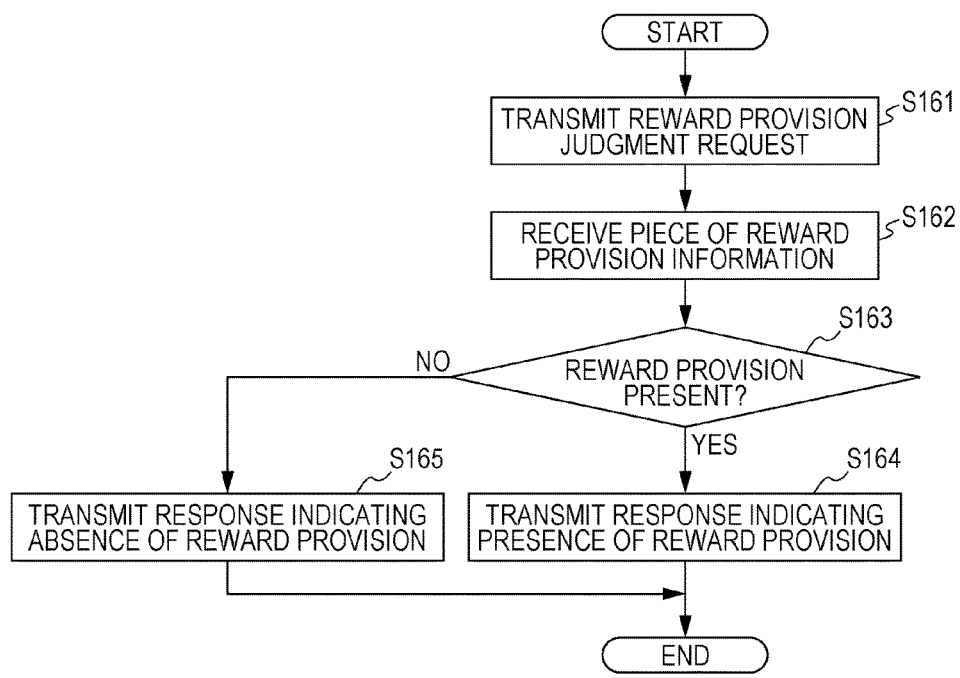
FIG. 31 is a flowchart of an achievement transmission process.
Figure 32A:
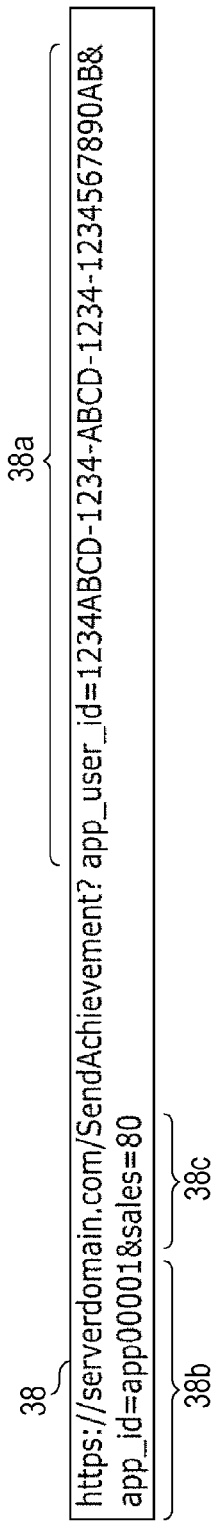
FIGS. 32A and 32B are views showing examples of a reward provision judgment request and a piece of reward provision information.
Figure 32B:
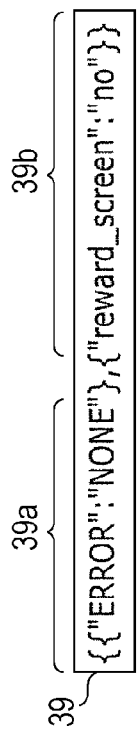

The achievement transmission process by the SDK unit 24 will be described in detail with reference to a flowchart. FIG. 31 is a flowchart of the achievement transmission process. FIGS. 32A and 32B are views showing examples of a reward provision judgment request (FIG. 32A) and a piece of reward provision information (FIG. 32B).

As shown in FIG. 31, the SDK unit 24 transmits a reward provision judgment request 38 with an app user ID 38a, an application ID 38b, and an achievement 38c as arguments to the server 10 (server control unit 11) (S161). The SDK unit 24 receives a piece 39 of reward provision information from the server 10 (S162). The piece 39 of reward provision information includes a response 39a indicating the presence or absence of an error and a response 39b indicating the presence or absence of reward provision.

If the piece 39 of reward provision information includes the response 39b indicating the presence of reward provision (YES in S163), the SDK unit 24 transmits a response indicating the presence of reward provision to the game unit 23 (S164). On the other hand, if the piece 39 of reward provision information includes the response 39b indicating the absence of reward provision (NO in S163), the SDK unit 24 transmits a response indicating the absence of reward provision to the game unit 23 (S165).

Figure 33:
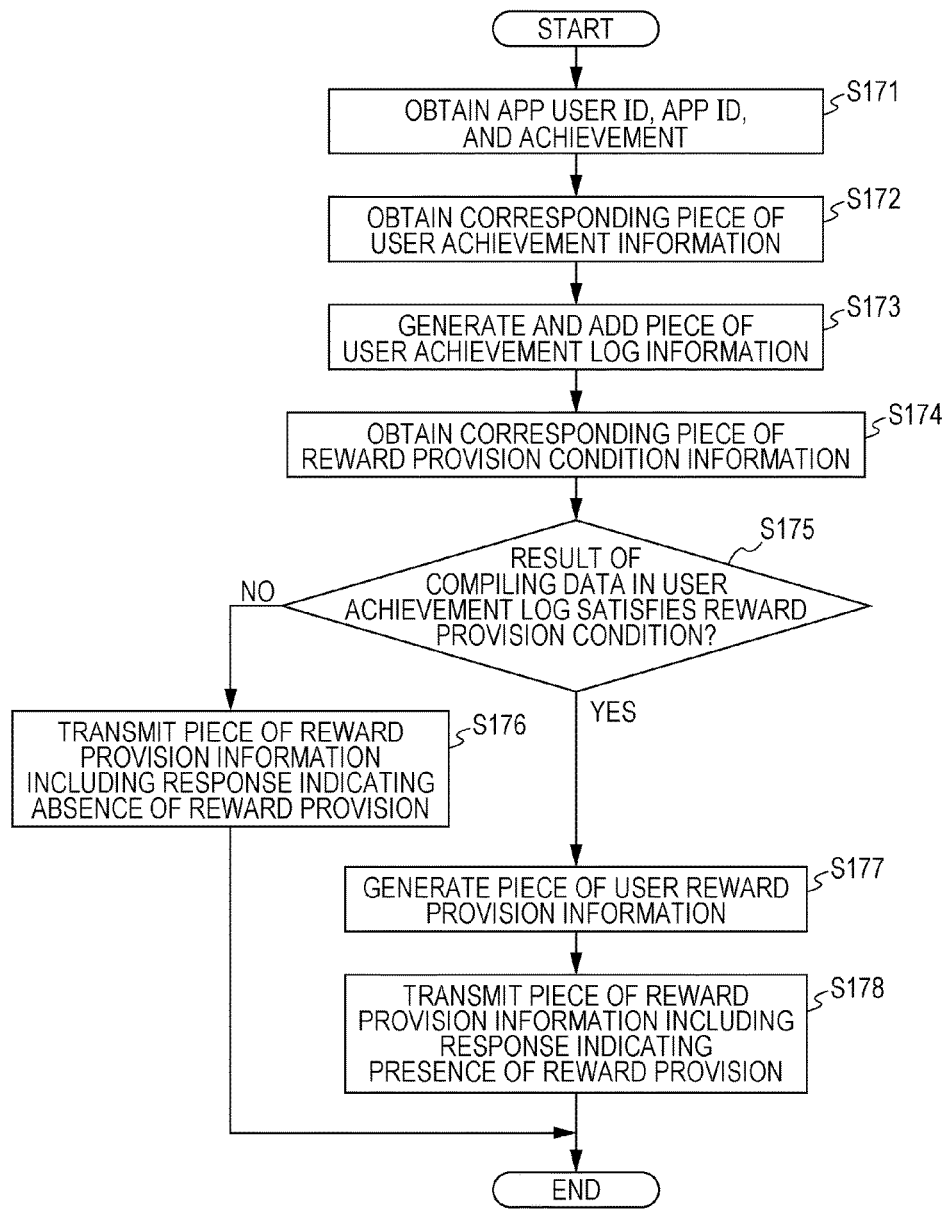
FIG. 33 is a flowchart of a reward provision judgment process.
Figure 35A:
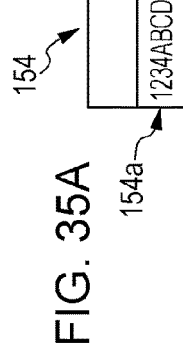
FIGS. 35A to 35C are charts showing examples of a user achievement log and user reward provision information.
Figure 35B:
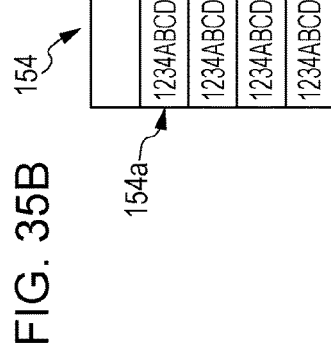
Figure 35C:
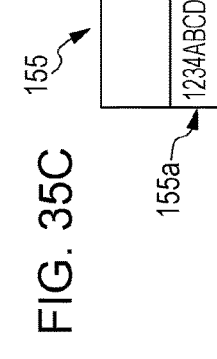

The reward provision judgment process by the server control unit 11 will be described in detail with reference to a flowchart. FIG. 33 is a flowchart of the reward provision judgment process. FIG. 34 is a chart showing an example of the reward provision condition information 143. FIGS. 35A to 35C are charts showing examples of the user achievement log 154 (FIGS. 35A and 35B) and the user reward provision information 155 (FIG. 35C).

The server control unit 11 obtains the app user ID 38a, the application ID 38b, and the achievement 38c from the reward provision judgment request 38 received from the SDK unit 24 (S171). The server control unit 11 refers to the user achievement information 152 in the user information DB 15 and obtains the piece 152f of user achievement information corresponding to a combination of the app user ID 38a and the application ID 38b (S172).

The server control unit 11 generates a piece 154a of user achievement log information formed by affixing a current time to the app user ID 38a, the application ID 38b, and the achievement 38c and adds the piece 154a of user achievement log information to the user achievement log 154 (S173). The server control unit 11 refers to the reward provision condition information 143 and obtains a piece 143a of reward provision condition information corresponding to the application ID 38b and a user level (S174). Note that the piece 143a of reward provision condition information includes a reward ID 143b, as shown in FIG. 34.

If a result of compiling data in the user achievement log 154 satisfies the piece 143a of reward provision condition information (YES in S175), the server control unit 11 generates a piece of the user reward provision information 155 (S177). As shown in FIG. 35C, a specific piece 155a of user reward provision information includes the app user ID 38a, the application ID 38b, the reward ID 143b, a gift ID, a screen-displayed flag, and a reward-provided flag. Note that the gift ID is an arbitrary unique numerical value (for example, an integer increasing simply from 1 which does not overlap with that of any other piece of user reward provision information) and that the screen-displayed flag and the reward-provided flag are all set to "FALSE" at this time.

The server control unit 11 transmits the piece 39 of reward provision information including the response 39b indicating the presence of reward provision to the SDK unit 24 (S178).

If the result of compiling the data in the user achievement log 154 does not satisfy the piece 143a of reward provision condition information in step S175 (NO in S175), the server control unit 11 transmits the piece 39 of reward provision information including the response 39b indicating the absence of reward provision to the SDK unit 24 (S176).

Figure 36:
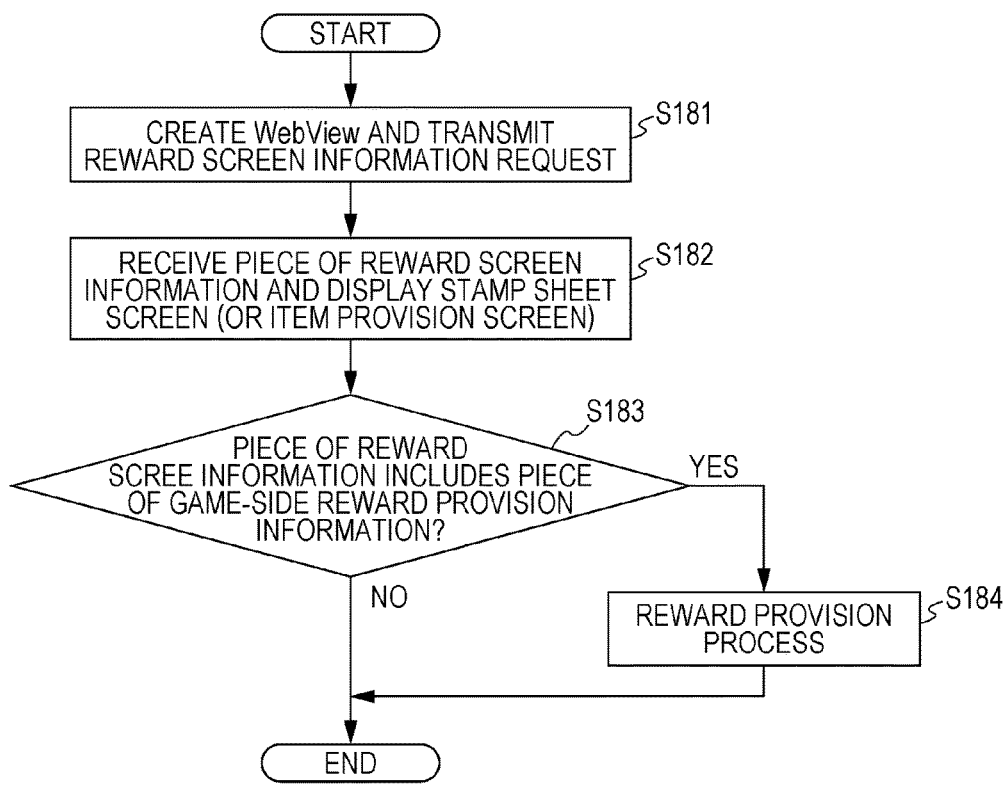
FIG. 36 is a flowchart of a reward screen display process.
Figure 37:
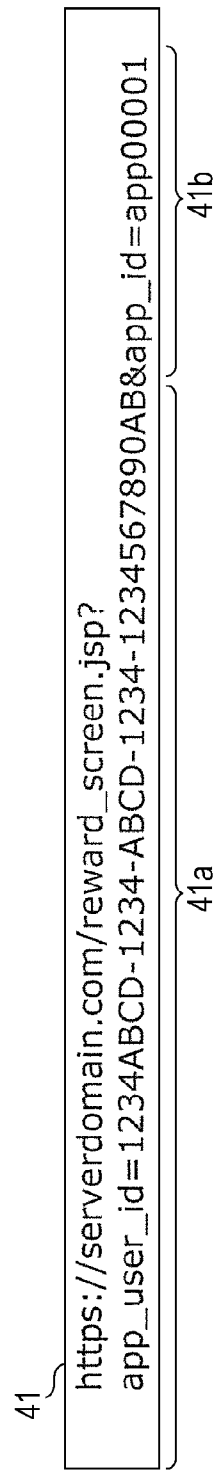
FIG. 37 is a view showing an example of a reward screen information request.
Figure 38:
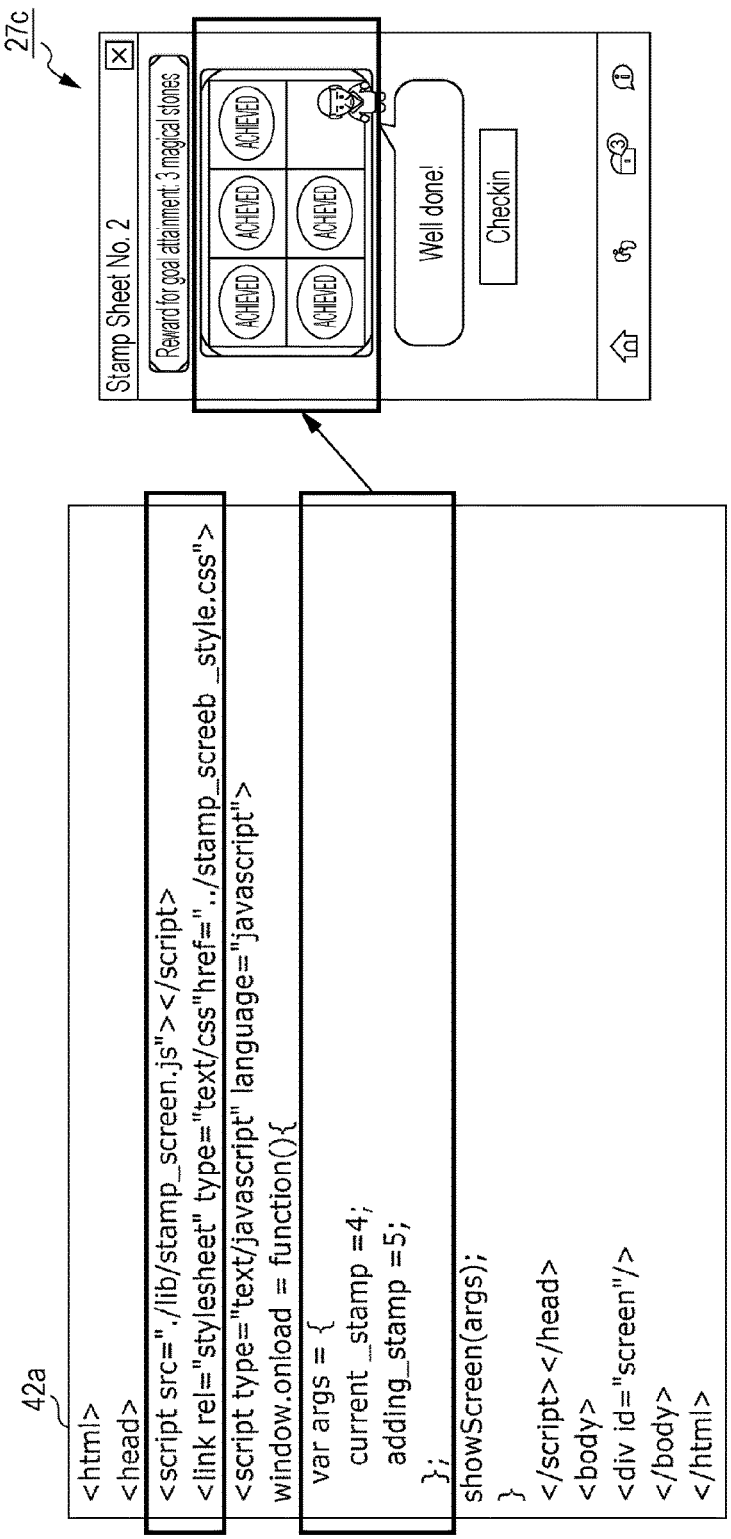
FIG. 38 is a view showing an example of a piece of reward screen information to display a stamp sheet screen.
Figure 39:
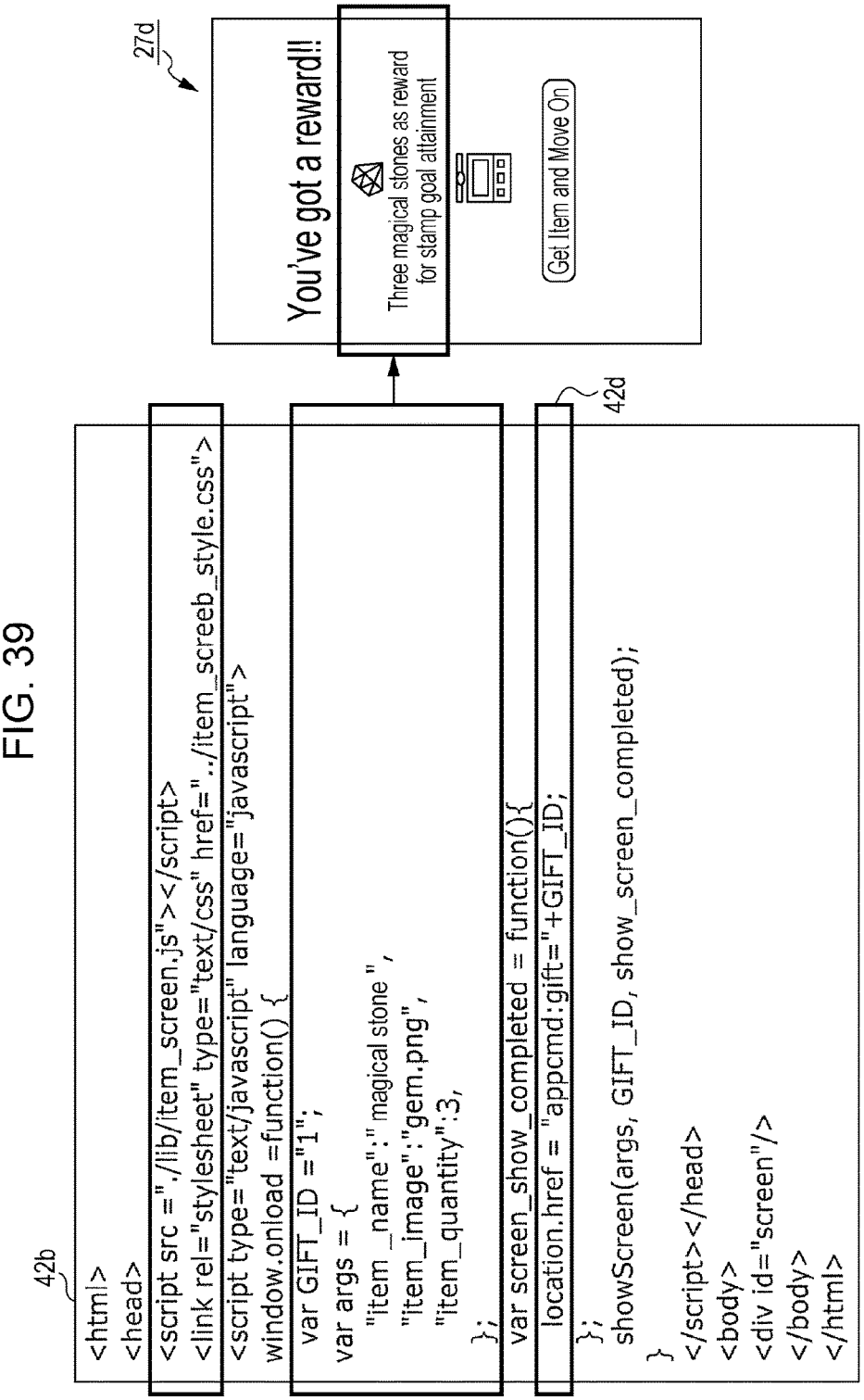
FIG. 39 is a view showing an example of a piece of reward screen information to display an item provision screen.

The reward screen display process will be described below with reference to a flowchart. FIG. 36 is a flowchart of the reward screen display process. FIG. 37 is a view showing an example of a reward screen information request. FIG. 38 is a view showing an example of a piece of reward screen information to display the stamp sheet screen 27c. FIG. 39 is a view showing an example of a piece of reward screen information to display an item provision screen.

The SDK unit 24 creates a WebView and transmits a reward screen information request 41 with an app user ID 41a and an application ID 41b as arguments to the server 10 (server control unit 11) (S181).

The SDK unit 24 receives a piece 42a of reward screen information (or a piece 42b of reward screen information) from the server control unit 11 and displays the stamp sheet screen 27c (or an item provision screen 27d) as a reward screen on the WebView (S182).

For example, to produce a display in which a fifth stamp is imprinted on the stamp sheet screen 27c with four stamps imprinted thereon, the piece 42a of reward screen information is described, as indicated by bold boxes in FIG. 38. For example, to display the item provision screen 27d with an image, the name, and the quantity of an item specified, the piece 42b of reward screen information is described, as in FIG. 39. That is, the image display process showScreen( ) described in JavaScript® dynamically displays a stamp provision screen or a reward screen in accordance with arguments. Note that the details of processing by showScreen( ) are omitted.

If the piece 42a of reward screen information (or the piece 42b of reward screen information) includes a piece 42d of game-side reward provision information (YES in S183), the SDK unit 24 performs the reward provision process (S184). Specifically, the piece 42d of game-side reward provision information is "location.href="appcmd:gift="+GIFT_ID"" in a 14th line of the piece 42b of reward screen information. This is a common method for calling the reward provision process by the SDK unit 24 from a process described in JavaScript®.

The description "location.href=" followed by a URL is used to switch a Web page displayed on a WebView to the URL. The WebView inquires of the SDK unit 24 that is the generator of the WebView about whether switching is possible. If the URL starts with "appcmd:", the SDK unit 24 does not determine that the description represents switching to the URL but determines that the description represents a processing request from JavaScript® to the SDK unit 24. In the case of the piece 42*b* of reward screen information, the reward provision process is performed with "gift=1" as an argument.

Note that a process in the 14th line of the piece 42*b* of reward screen information is a process inside the function screen_show_completed( ). The function screen_show_completed( ) is specified as an argument of showScreen( ), and showScreen( ) calls screen_show_completed( ) after display of the reward screen.

Figure 40:
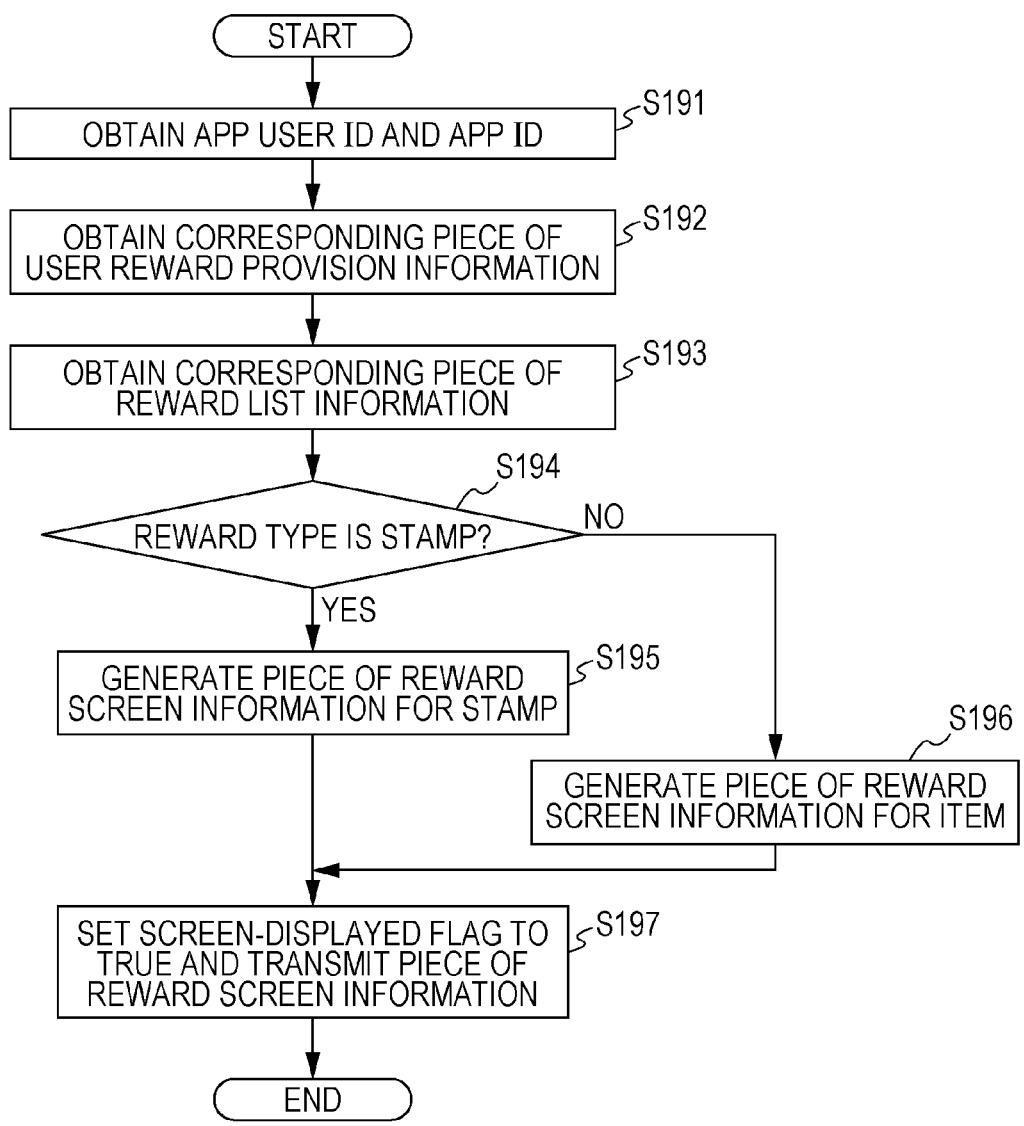
FIG. 40 is a flowchart of a method for generating a piece of reward screen information.

A method for generating a piece of reward screen information will be described with reference to a flowchart. FIG. 40 is a flowchart of the method for generating a piece of reward screen information. FIG. 41 is a chart showing an example of the reward list information 144.

The server control unit 11 obtains the app user ID 41*a* and the application ID 41*b* from the reward screen information request 41 (S191). The server control unit 11 then obtains the piece 155*a* of user reward provision information corresponding to the obtained app user ID 41*a* and application ID 41*b* from the user reward provision information 155 (S192). Note that search conditions at this time include that the screen-displayed flag is "FALSE", that is, that a search target is limited to pieces 155*a* of user reward provision information that are not yet displayed.

The server control unit 11 obtains a piece 144*a* of reward list information corresponding to the application ID 41*b* and the obtained piece 155*a* of user reward provision information from the reward list information 144 (S193).

If a reward type of the piece 144*a* of reward list information is a stamp (YES in S194), the server control unit 11 generates the piece 42*a* of reward screen information (S195). Specifically, the server control unit 11 generates the piece 42*a* of reward screen information using the stamp sheet 152*b* and the number 152*c* of stamps included in the piece 152*f* of user achievement information, and the number of stamps after reward provision that is obtained by adding a "reward quantity" in the piece 144*a* of reward list information to the number of stamps (a goal stamp number if the sum exceeds the goal stamp number).

If the reward type of the piece 144*a* of reward list information is an item (NO in S194), the server control unit 11 generates the piece 42*b* of reward screen information using the gift ID included in the piece 155*a* of user reward provision information and a reward image and a reward name included in the piece 144*a* of reward list information (S196).

Finally, the server control unit 11 sets the screen-displayed flag of the piece 155*a* of the user reward provision information to "TRUE" ("ON") and transmits the piece 42*a* of reward screen information (or the piece 42*b* of reward screen information) to the SDK unit 24 (S197). Note that the server control unit 11 may set the screen-displayed flag of the piece 155*a* of the user reward provision information to "TRUE" after transmitting the piece 42*a* of reward screen information (or the piece 42*b* of reward screen information) to the SDK unit 24.

Figure 42:
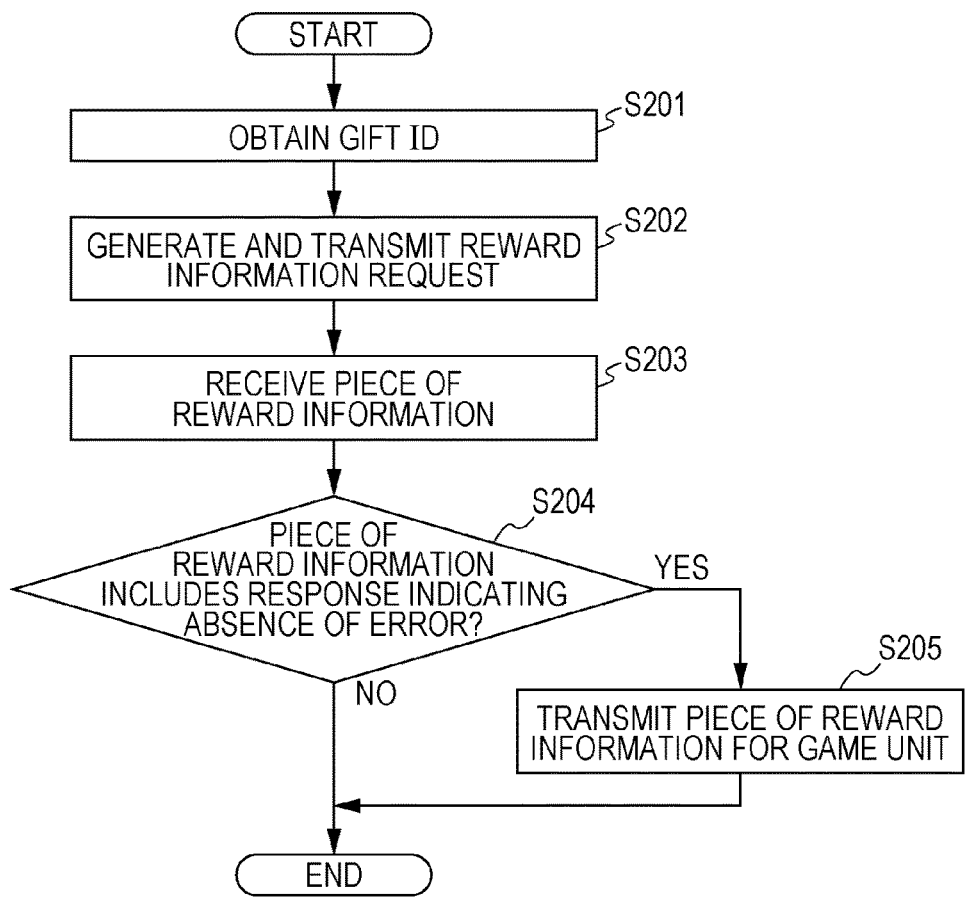
FIG. 42 is a flowchart of a reward provision process.
Figure 43A:
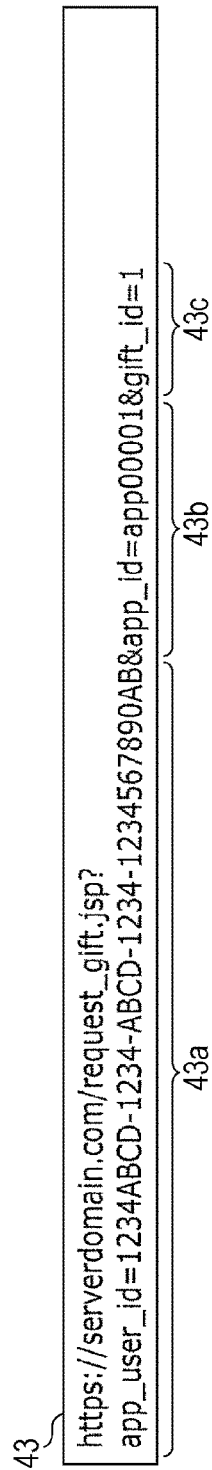
FIGS. 43A and 43B are views showing examples of a reward information request and a piece of reward information.
Figure 43B:
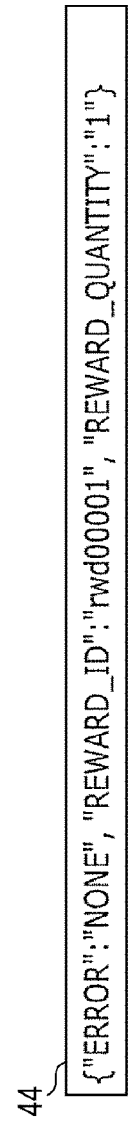

The reward provision process (S184 of FIG. 38) will be described in detail with reference to a flowchart. FIG. 42 is a flowchart of the reward provision process. FIGS. 43A and 43B are charts showing examples of a reward information request (FIG. 43A) and a piece of reward information (FIG. 43B).

The SDK unit 24 obtains a gift ID from the piece 42*a* of reward screen information (or the piece 42*b* of reward screen information) transmitted from the server control unit 11 (S201). The SDK unit 24 then generates a reward information request 43 with an app user ID 43*a*, an application ID 43*b*, and a gift ID 43*c* as arguments and transmits the reward information request 43 to the server control unit 11 (S202).

The SDK unit 24 receives a piece 44 of reward information from the server control unit 11 (S203). If the piece 44 of reward information includes a response indicating the absence of an error ("ERROR":"NONE") (YES in S204), the SDK unit 24 transmits a piece of reward information for the game unit 23 which includes at least a reward ID and a reward quantity of the piece 44 of reward information to the game unit 23 (S205).

Figure 44:
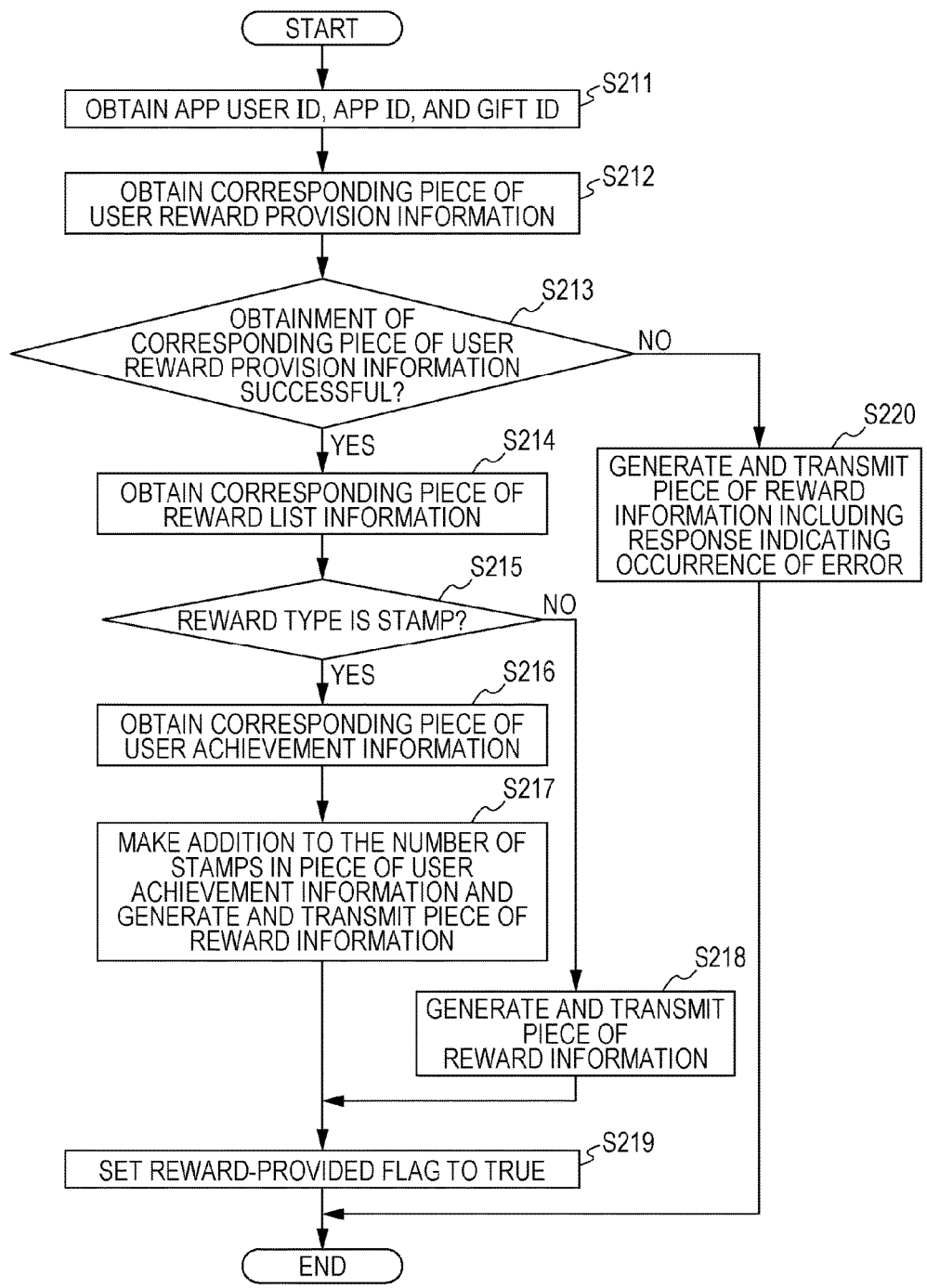
FIG. 44 is a flowchart of a reward information generation process.

The reward information generation process will be described in detail with reference to a flowchart. FIG. 44 is a flowchart of the reward information generation process.

The server control unit 11 obtains the app user ID 43*a*, the application ID 43*b*, and the gift ID 43*c* from the reward information request 43 obtained from the SDK unit 24 (S211). The server control unit 11 then obtains the piece 155*a* of user reward provision information corresponding to the app user ID 43*a*, the application ID 43*b*, and the gift ID 43*c* from the user reward provision information 155 (S212). Note that one of search conditions at this time is that a reward-provided flag is "FALSE".

If the server control unit 11 is successful in obtaining the corresponding piece 155*a* of user reward provision information (YES in S213), the server control unit 11 obtains the piece 144*a* of reward list information corresponding to the application ID 43*b* and a reward ID included in the piece 155*a* of user reward provision information from the reward list information 144 (S214).

If a reward type of the piece 144*a* of reward list information is a stamp (YES in S215), the server control unit 11 obtains the piece 152*f* of user achievement information corresponding to the app user ID 43*a* and the application ID 43*b* from the user achievement information 152 (S216). The server control unit 11 then adds a reward quantity (the number of stamps) identified by the piece 144*a* of reward list information to the number of stamps in the piece 152*f* of user achievement information and generates and transmits the piece 44 of reward information (S217). With these operations, the number of stamps in the piece 152*f* of user achievement information is increased, as shown in FIG. 13C described above.

If the reward type of the piece 144*a* of reward list information is an item (NO in S215), the server control unit 11 generates and transmits the piece 44 of reward information (S218). The piece 44 of reward information at this time includes the reward ID included in the piece 155*a* of user reward provision information and the reward quantity included in the piece 144*a* of reward list information.

The server control unit 11 sets a reward-provided flag of the piece 155*a* of user reward provision information to "TRUE" after steps S217 and S218 (S219).

If the server control unit 11 is unsuccessful in obtaining the corresponding piece 155*a* of user reward provision information in step S212 described above (NO in S213), the server control unit 11 generates and transmits the piece 44 of reward information including a response indicating occurrence of an error ("ERROR":"NO_REWARD_FOUND") (S220).

Although not shown, if the number of stamp exceeds a goal stamp number in the stamp addition process, the server control unit 11 obtains a reward ID for the current stamp sheet 152b from the stamp information 141 and generates the piece 155a of user reward provision information. Note that the procedure for the user reward provision information generation is the same as in step S177 and that a detailed description thereof will be omitted. The server control unit 11 also updates the piece 152f of user achievement information (increments a stamp sheet by 1 and resets the number of stamps).

[Checkin-Based Reward Provision]

Figure 45:
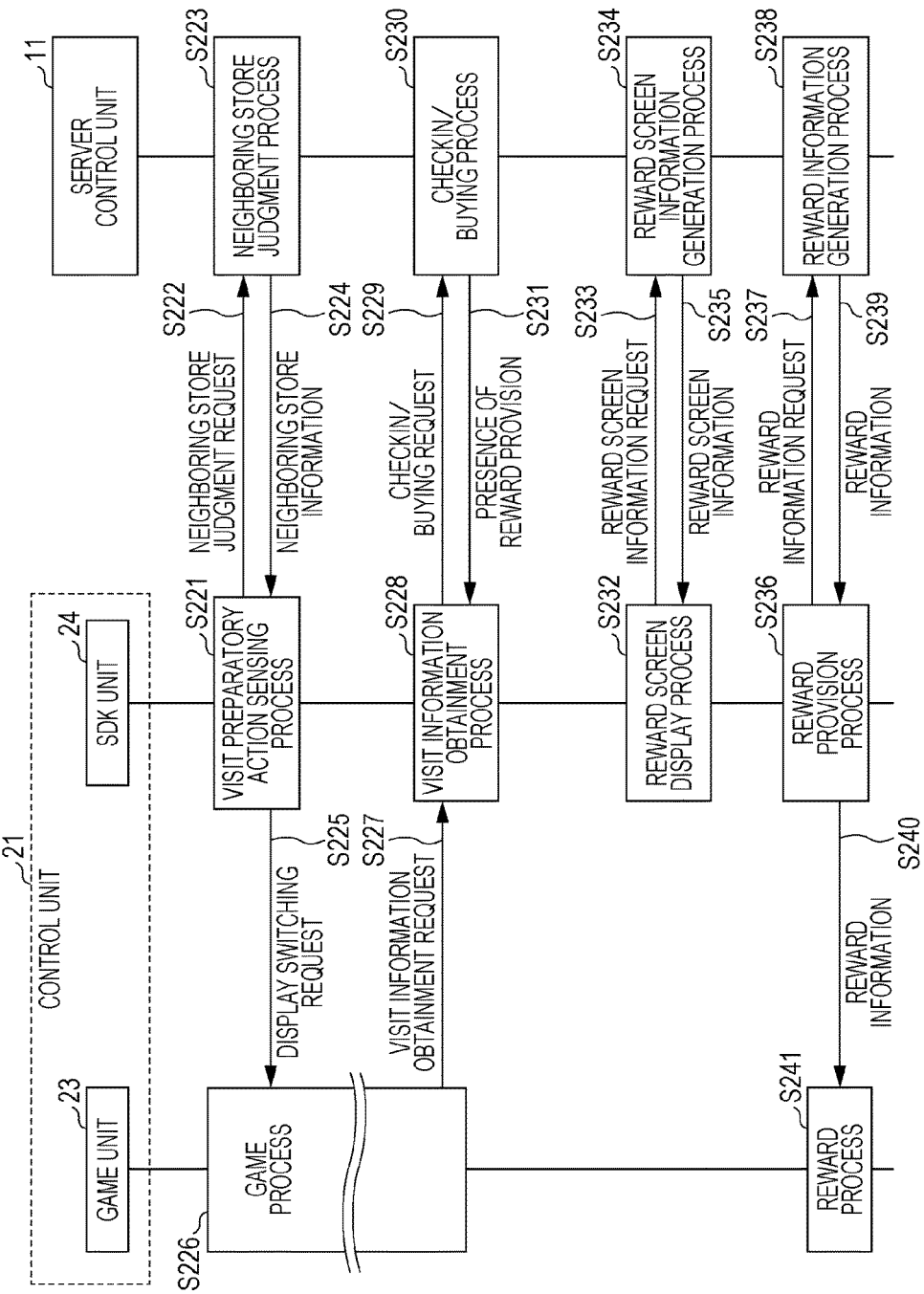
FIG. 45 is a sequence chart of checkin-based reward provision.

Reward provision based on checkin (or buying at the store 30) that is a process characteristic of the game reward provision system 100 will be described. FIG. 45 is a sequence chart of checkin-based reward provision. Note that checkin in the first embodiment refers to a process in which the mobile terminal 20 obtains a piece of identification information for stamp provision (a piece of information including a store ID or a purchase ID in the first embodiment) by, for example, reading a two-dimensional code provided at the store 30 with an image pickup unit of the mobile terminal 20.

The SDK unit 24 first performs a visit preparatory action sensing process (S221) and transmits a neighboring store judgment request to the server control unit 11 (S222). The server control unit 11 performs a neighboring store judgment process (S223) and transmits a piece of neighboring store information to the SDK unit 24 (S224).

The SDK unit 24 transmits a display switching request to the game unit 23 in accordance with a result of the neighboring store judgment process (S225). At this time, the game unit 23 is during the game process (S226). After receiving the display switching request, the game unit 23 proceeds with the game process without interrupting a game experience of a player and then transmits a visit information obtainment request to the SDK unit 24 (S227). Note that the game unit 24 may display a button saying that "the current screen will switch to a checkin screen" upon receipt of the display switching request and transmit the visit information obtainment request to the SDK unit 24 at a time when a user presses the button.

The SDK unit 24 performs a visit information obtainment process (S228). Specifically, the SDK unit 24 transmits a checkin request (or a buying request) to the server control unit 11 (S229), and the server control unit 11 performs a checkin process (buying process) (S230). If reward provision is necessary, the server control unit 11 transmits a response indicating the presence of reward provision (a piece of reward provision information) to the SDK unit 24 (S231). After that, a reward screen display process (S232) to a reward process (S241) are performed. Since these processes are the same as those described earlier, a detailed description thereof will be omitted.

Figure 46:
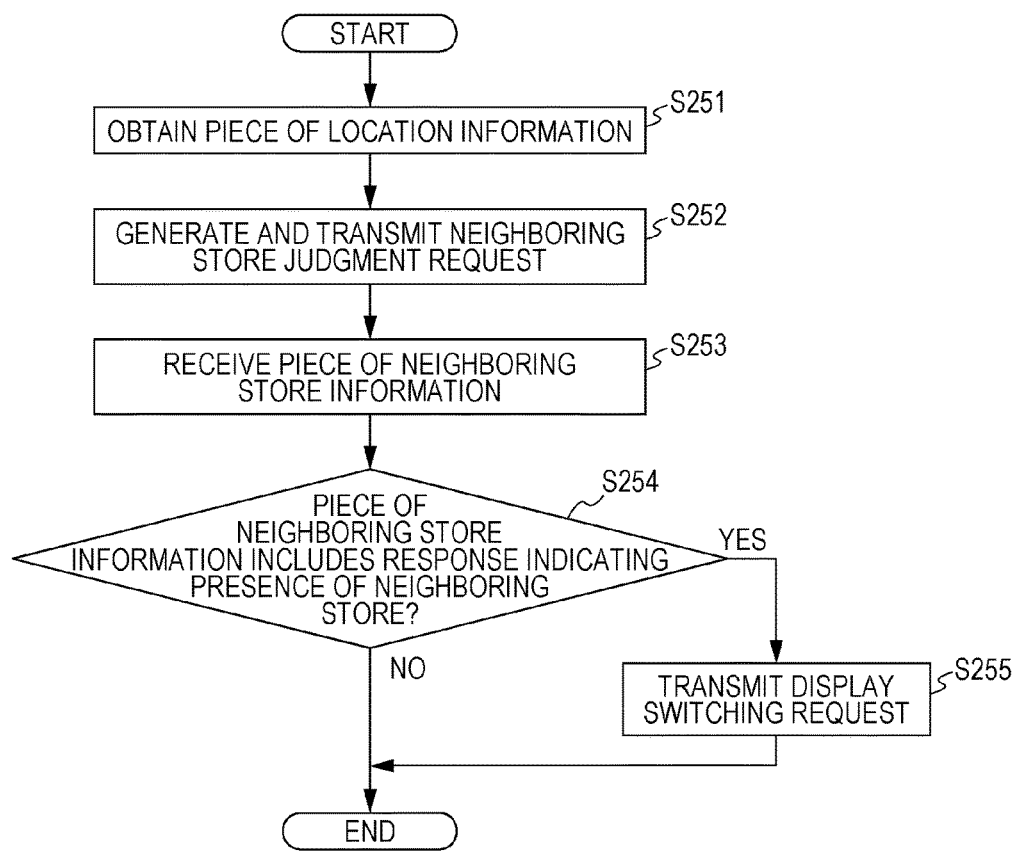
FIG. 46 is a flowchart of a visit preparatory action sensing process.
Figure 47A:
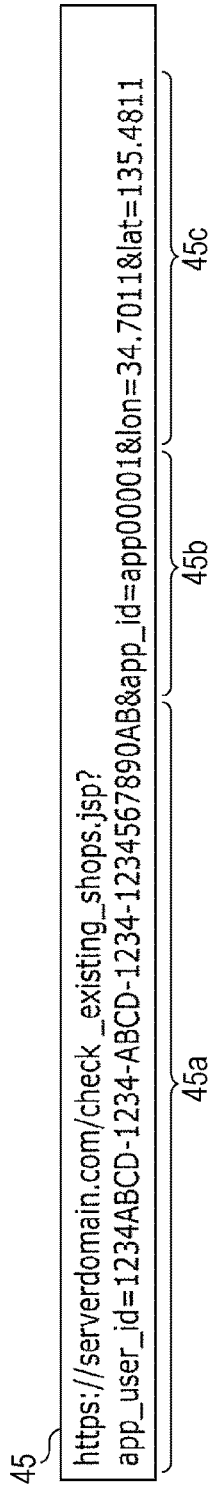
FIGS. 47A and 47B are views showing examples of a neighboring store judgment request and a piece of neighboring store information.
Figure 47B:
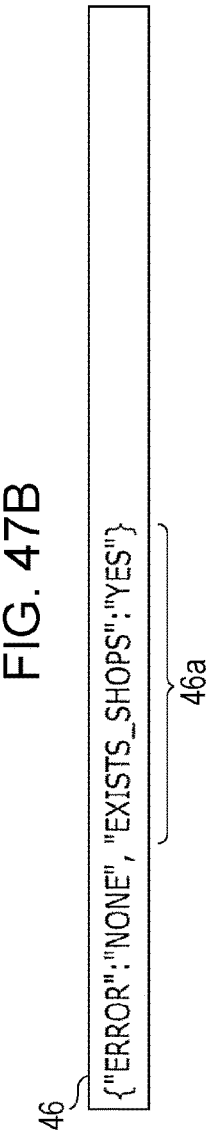

The visit preparatory action sensing process will be described in detail with reference to a flowchart. FIG. 46 is a flowchart of the visit preparatory action sensing process. FIGS. 47A and 47B are charts showing examples of a neighboring store judgment request (FIG. 47A) and a piece of neighboring store information (FIG. 47B).

The SDK unit 24 activates a location information obtainment unit of the mobile terminal 20 and obtains a piece of location information (S251). Specifically, the location information obtainment unit is a GPS module. The location information obtainment unit may be in any form as long as the location information obtainment unit can obtain the location of the mobile terminal 20.

The SDK unit 24 generates a neighboring store judgment request 45 and transmits the neighboring store judgment request 45 to the server control unit 11 (S252). As shown in FIG. 47A, the neighboring store judgment request 45 includes an app user ID 45a, an application ID 45b, and a piece 45c of location information.

The SDK unit 24 then receives a piece 46 of neighboring store information from the server control unit 11 (S253). As shown in FIG. 47B, the piece 46 of neighboring store information includes a response 46a indicating the presence or absence of a neighboring store.

If there is a neighboring store, that is, the piece 46 of neighboring store information includes the response 46a indicating the presence of a neighboring store (YES in S254), the SDK unit 24 transmits a display switching request to the game unit 23 (S255).

Figure 48:
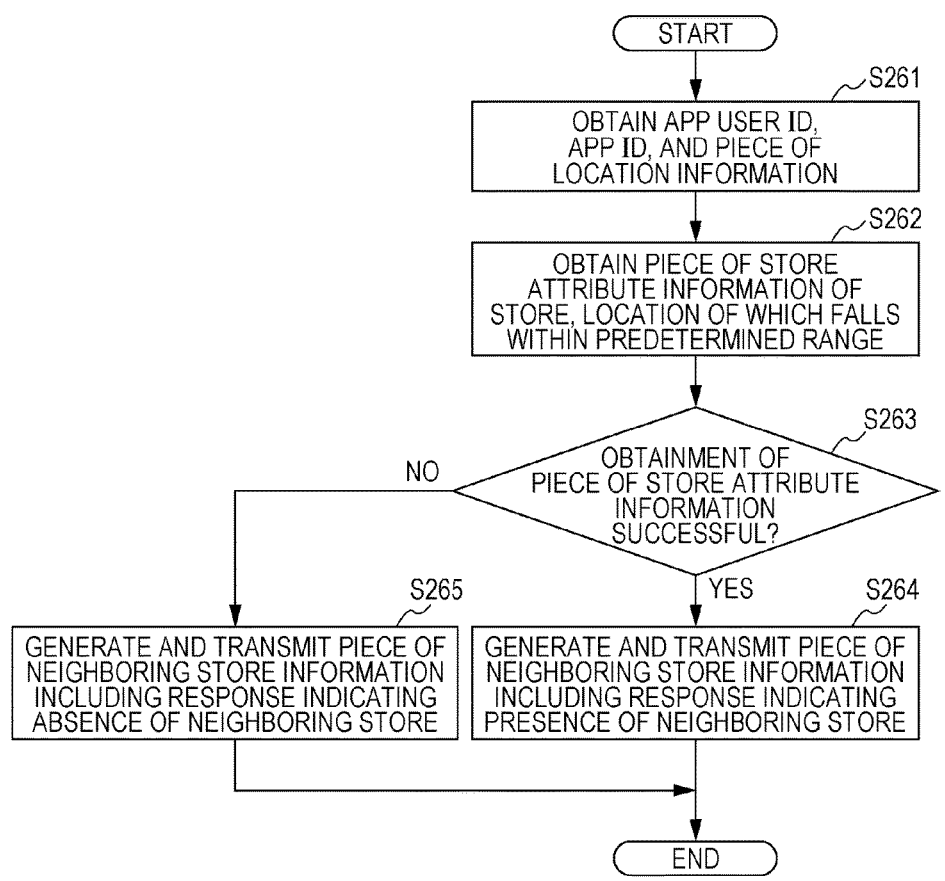
FIG. 48 is a flowchart of a neighboring store judgment process.

The neighboring store judgment process will be described in detail with reference to a flowchart. FIG. 48 is a flowchart of the neighboring store judgment process.

The server control unit 11 obtains the app user ID 45a, the application ID 45b, and the piece 45c of location information from the received neighboring store judgment request 45 (S261). The server control unit 11 refers to the store attribute information 131 and obtains a piece of store attribute information of a store, a location of which falls within a predetermined range (S262). The server control unit 11 obtains, for example, a piece of store attribute information belonging to an area within 500 m of a location indicated by the piece 45c of location information.

If the server control unit 11 is successful in obtaining one or more pieces of store attribute information (YES in S263), the server control unit 11 generates the piece 46 of neighboring store information including the response 46a indicating the presence of a neighboring store and transmits the piece 46 of neighboring store information to the SDK unit 24 (S264). On the other hand, if the server control unit 11 is unsuccessful in obtaining a piece of store attribute information (NO in S263), the server control unit 11 generates the piece 46 of neighboring store information including the response 46a indicating the absence of a neighboring store and transmits the piece 46 of neighboring store information to the SDK unit 24 (S265).

Figure 49:
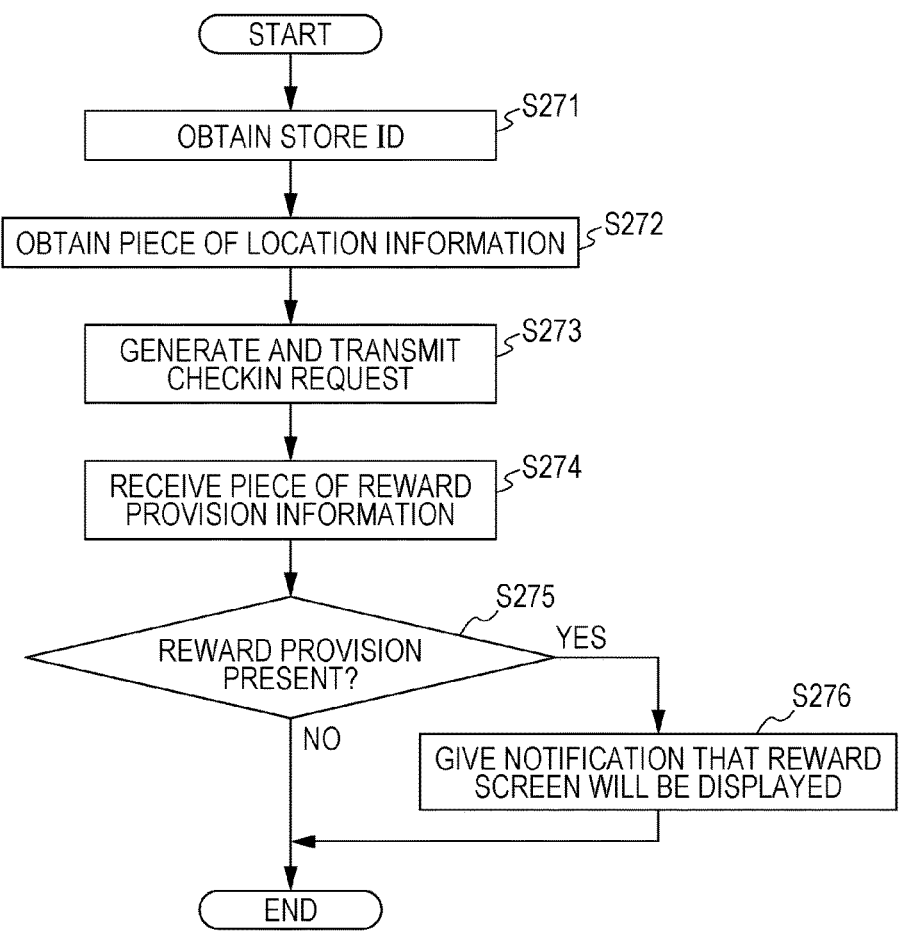
FIG. 49 is a flowchart of a visit information obtainment process.
Figure 51:
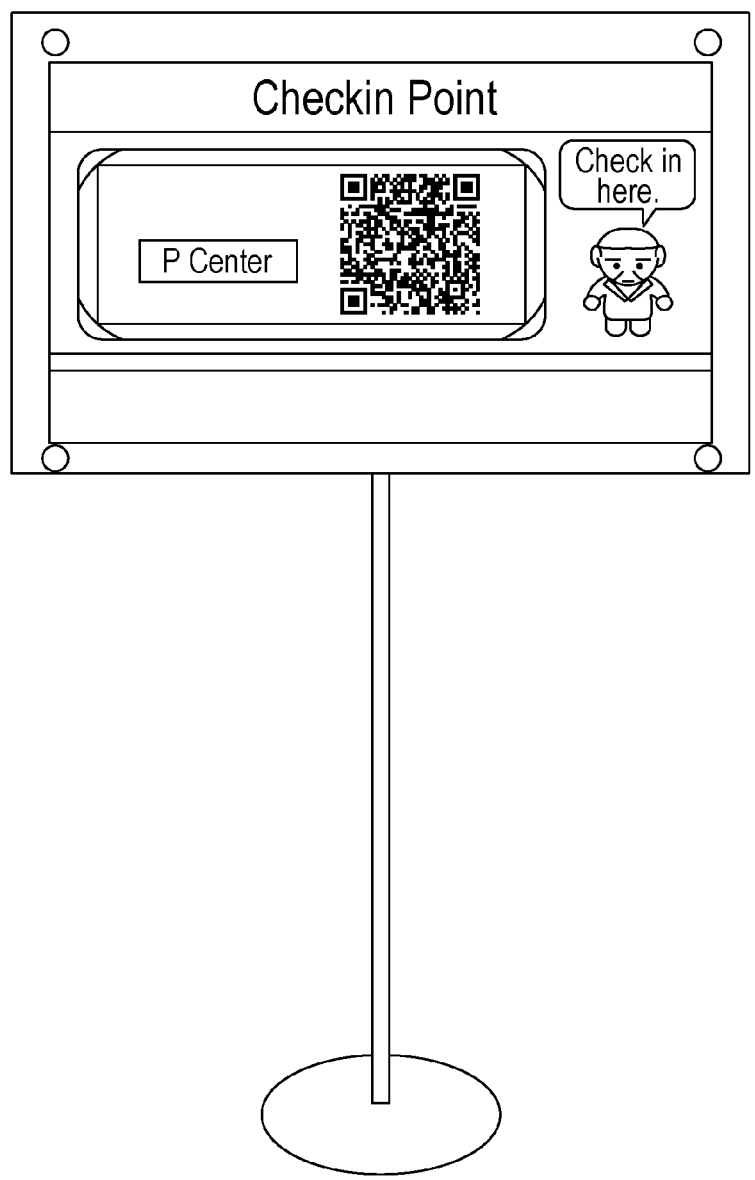
FIG. 51 is a view showing an example of a two-dimensional code used for checkin.

The visit information obtainment process will be described in detail with reference to a flowchart. FIG. 49 is a flowchart of the visit information obtainment process. FIGS. 50A and 50B are views showing examples of a checkin request (FIG. 50A) and a piece of reward provision information (FIG. 50B). FIG. 51 is a view showing an example of a two-dimensional code used for checkin.

The SDK unit 24 first activates the image pickup unit of the mobile terminal 20 and obtains a store ID (a piece of identification information including the store ID) from a two-dimensional code by causing the image pickup unit to read the two-dimensional code (S271). As shown in FIG. 51, a panel bearing a two-dimensional code printed thereon is installed at the store 30, and the two-dimensional code includes a store ID as a piece of information. A user visits the store 30 and reads the two-dimensional code with the mobile terminal 20. The two-dimensional code is, for example, a QR Code® but may be any other two-dimensional code. A barcode or any other piece of identification information may be used instead of a two-dimensional code. Note that an ID to be obtained in step S271 may be a buying ID (to be described later).

The SDK unit 24 then activates the location information obtainment unit of the mobile terminal 20 and obtains a piece of location information (S272).

The SDK unit 24 generates a checkin request 47 and transmits the checkin request 47 to the server control unit 11

(S273). As shown in FIG. 50A, the checkin request 47 includes an app user ID 47a, an application ID 47b, a piece 47c of location information, and a store or buying ID 47d.

The SDK unit 24 receives a piece 48 of reward provision information from the server control unit 11 (S274). As shown in FIG. 50B, the piece 48 of reward provision information includes a response 48a indicating the presence or absence of reward provision.

In the presence of reward provision (YES in S275), the SDK unit 24 gives a notification that a reward screen will be displayed to the game unit 23 (S276). The reward screen display process described above is performed. Note that the reward screen display process to be performed here is different from the reward screen display process described above in that an advertisement banner is displayed.

Figure 52:
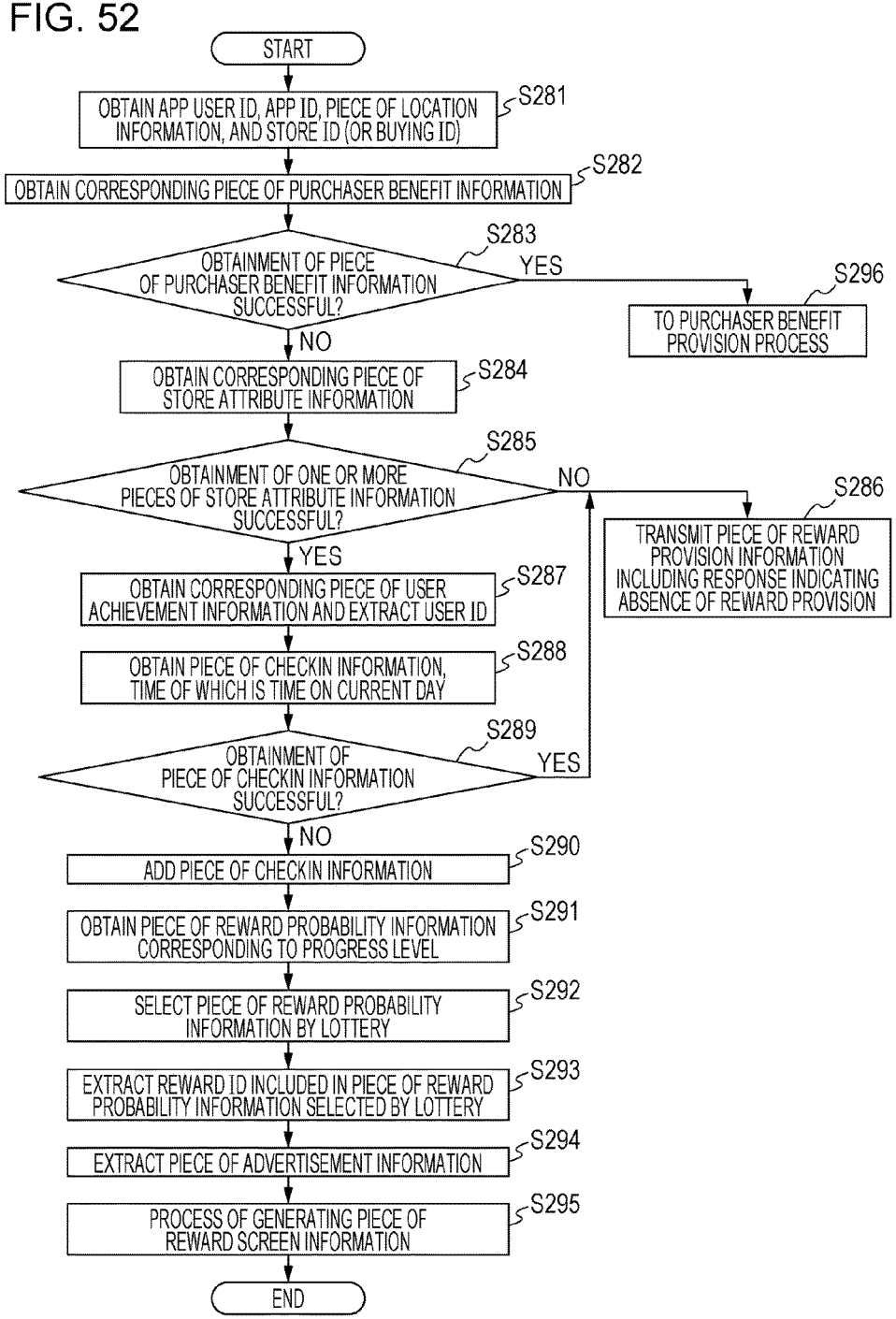
FIG. 52 is a flowchart of a checkin process (buying process)

The checkin process (buying process) will be described in detail with reference to a flowchart. FIG. 52 is a flowchart of the checkin process (buying process). FIG. 53 is a chart showing an example of the reward probability information 145. FIG. 54 is a chart showing an example of the advertisement information 132. FIG. 55 is a chart showing an example of the purchaser benefit information 133.

The server control unit 11 receives the checkin request 47 from the SDK unit 24 and obtains, from the received checkin request 47, the app user ID 47a, the application ID 47b, the piece 47c of location information, and the store or buying ID 47d (S281).

The server control unit 11 refers to the purchaser benefit information 133 and obtains a piece 133a of purchaser benefit information, a buying ID of which matches the store or buying ID 47d, in order to judge whether the store or buying ID 47d is a store ID or a buying ID (S282). If the server control unit 11 is unsuccessful in obtaining the piece 133a of purchaser benefit information (NO in S283), the server control unit 11 judges that the store or buying ID 47d is a buying ID, and refers to the store attribute information 131 to obtain a piece of store attribute information (the piece 131a of store attribute information, for example), a store ID of which matches the store or buying ID 47d (S284). Note that if the server control unit 11 is successful in obtaining the piece 133a of purchaser benefit information (YES in S283), the server control unit 11 performs a purchaser benefit provision process (to be described later) (S296).

The piece 131a of store attribute information to be obtained in step S284 is one having the store ID 47d (hereinafter not referred to as the store or buying ID 47d but referred to as the store ID 47d), and a piece of location information (a latitude and a longitude) close to the obtained piece 47c of location information. If the server control unit 11 is unsuccessful in obtaining the piece 131a of store attribute information satisfying these conditions (NO in S285), the server control unit 11 transmits a piece of reward provision information including a response indicating the absence of reward provision to the SDK unit 24 (S286).

The above-described processes in steps S284 to S286 mean that reading of a two-dimensional code alone is not enough for a user to receive checkin-based reward provision and that the user needs to read the two-demensional code near the store 30. This configuration ensures attraction of users to the store 30.

If the server control unit 11 is successful in obtaining the piece 131a of store attribute information satisfying the conditions in step S285 (YES in S285), the server control unit 11 refers to the user achievement information 152 to obtain the piece 152f of user achievement information with the app user ID 47a and the application ID 47b. The server control unit 11 extracts the user ID 152a from the obtained piece 152f of user achievement information (S287). The server control unit 11 refers to the user checkin log 153 and obtains a piece of checkin information which has the extracted user ID 152a and has a time on the current day (the piece 153a of checkin information, for example) (S288).

If the server control unit 11 is successful in obtaining the piece 153a of checkin information (YES in S289), the server control unit 11 transmits a piece of reward provision information including a response indicating the absence of reward provision to the SDK unit 24 (S286).

The above-described processes in steps S287 to S289 are performed so as to allow a user to receive checkin-based reward provision only once a day. Note that a waiting period for receiving checkin-based reward provision again is not limited to one day as described above and may be set to any other period. If reward provision is performed only once regardless of period, time determination in steps S287 to S289 is unnecessary.

If the server control unit 11 is unsuccessful in obtaining the piece 153a of checkin information in step S289 (NO in S289), the server control unit 11 adds (registers) a piece of checkin information including the user ID 152a, the store ID 47d, the application ID 47b, and a current time to (in) the user checkin log 153 (S290).

The server control unit 11 extracts the level 152d from the piece 152f of user achievement information obtained in step S287 and refers to the reward probability information 145 to obtain one or more pieces 145a of reward probability information having the application ID 47b and the level 152d (S291).

The level 152d here refers to a progress level indicating the progress of the game and is used to change the details of a reward corresponding to the progress level.

For example, the number of stamps or items to be provided as a reward is set so as to increase with increase in the progress level of the game. In a general game, the difficulty increases with increase in the progress level of the game. To maintain game balance, the number of stamps or items is set in the above-described manner.

The server control unit 11 selects by lottery one of the obtained one or more pieces 145a of reward probability information (S292). The selection is made on the basis of reward probabilities included in the pieces of reward probability information. The server control unit 11 extracts a reward ID included in the piece of reward probability information selected by lottery (S293). The server control unit 11 extracts a piece 132a of advertisement information having the store ID 47d from the advertisement information 132 (S294). Note that each piece of the advertisement information 132 is a piece of information used in combination with the store attribute information 131 and does not include a store ID or the like.

Finally, the server control unit 11 performs the process of generating a piece of reward screen information (steps S193 to S197 in FIG. 40) on the basis of the reward ID extracted in step S293 (S295).

Figure 56:
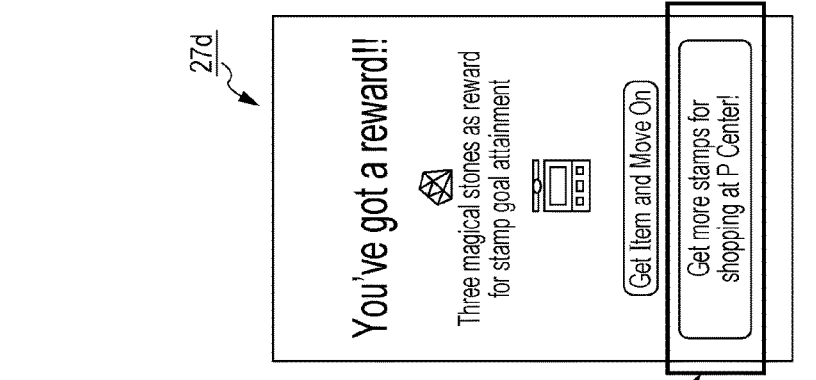
FIG. 56 is a view showing an example of a piece of reward screen information with a banner image added.

Note that if the server control unit 11 is successful in extracting the piece 132a of advertisement information in step S294, the server control unit 11 generates a piece of reward screen information with an added banner image (a piece of banner information) included in the extracted piece of advertisement information. FIG. 56 is a view showing an example of a piece of reward screen information with a banner image added. Note that a piece of reward screen information shown in FIG. 56 is used to display the item provision screen 27d and that the same applies to a piece of reward screen information used to display the stamp sheet screen 27c.

According to a piece 42c of reward screen information shown in FIG. 56, the item provision screen 27d including a banner image is displayed on the display unit of the mobile terminal 20. Like the item provision screen 27d, for example, a message saying that an additional stamp is provided in the case of shopping at a store with a two-dimensional code for checkin may be displayed in a banner image. This allows a user to be prompted to purchase merchandise at the store 30.

Figure 57A:
FIGS. 57A and 57B are views showing examples of a ticket bearing a printed two-dimensional code used in a purchaser benefit provision process.
Figure 57B:

The purchaser benefit provision process will be described. FIGS. 57A and 57B are views showing examples of a ticket bearing a printed two-dimensional code used in the purchaser benefit provision process.

Tickets shown in FIGS. 57A and 57B are each a business-card-sized piece of paper bearing a two-dimensional code including a buying ID and are distributed at the time of purchase of merchandise at the store 30. In the first embodiment, different tickets are distributed depending on the amount of merchandise purchase. For example, the ticket shown in FIG. 57A is distributed to a user who makes purchases of less than a predetermined amount (1,000 yen here), and the ticket shown in FIG. 57B is distributed to a user who makes purchases of the predetermined amount or more. That is, different kinds of tickets are distributed depending on the amount of purchase by a user. Note that the tickets shown in FIGS. 57A and 57B are distributed in return for merchandise purchase and need not be read in the neighborhood of the store 30, unlike the two-dimensional code for checkin (FIG. 51) at the store 30.

The purchaser benefit provision process (a process in the case of YES in step S283 of FIG. 52) will be described in detail below with reference to a flowchart. FIG. 58 is a flowchart of the purchaser benefit provision process. FIG. 59 is a chart showing an example of the purchaser benefit reward information 146.

If a used flag of the piece 133a of purchaser benefit information obtained in step S283 of FIG. 52 is "TRUE" (YES in S301), the server control unit 11 transmits a piece of reward provision information including a response indicating the absence of reward provision to the SDK unit 24 (S302).

If the used flag of the piece 133a of purchaser benefit information obtained in step S283 of FIG. 52 is "FALSE" (NO in S301), the server control unit 11 refers to the purchaser benefit reward information 146 to obtain a piece 146a of purchaser benefit reward information (S303). The piece 146a of purchaser benefit reward information to be obtained here is a piece of purchaser benefit reward information having a purchaser benefit ID included in the piece 133a of purchaser benefit information.

The server control unit 11 updates the used flag of the piece 133a of purchaser benefit information to "TRUE" (S304). The server control unit 11 then performs the process of generating a piece of reward screen information (steps S193 to S197 of FIG. 40) on the basis of a reward ID included in the obtained piece 146a of purchaser benefit reward information (S305).

As has been described above, the game reward provision system 100 according to the first embodiment allows a user to obtain a reward in the same form as that of a reward obtained with progression of a game, on the basis of checkin.

The game reward provision system 100 can be said to apply a game-like approach of expressing an accumulation of small achievements using effective visual effects, such as imprinting of a stamp, to lead to a large achievement and a reward to a user's real action (a visit to a store). This approach is called gamification and has been provided to be effective. Note that gamification refers to a methodology for applying the mechanism of a game to other fields, such as the fields of health and education, and making improvements in the fields.

In order to implement the game reward provision system 100, it suffices to incorporate the above-described SDK (the SDK unit 24) into an existing game application (the game unit 23). In other words, it is easy to add the above-described checkin-based reward provision function to an existing game application. That is, the game reward provision system 100 can be said to be versatile.

[Summary]

An information provision method using the game reward provision system 100 according to the first embodiment has been described above. The game reward provision system 100 is loaded with an application for a game of a type to obtain a game remuneration corresponding to a progress level of the game and is connected to the mobile terminal 20 having a display over the network 40.

The game reward provision system 100 is an example of an information management system, and the mobile terminal 20 is an example of information equipment. Specifically, a game remuneration is a stamp or an item obtained in a game.

The information provision method according to the first embodiment involves receiving an application ID indicating the game application running on the mobile terminal 20 and a user ID indicating a user of the game application (an app user ID) together with a store ID indicating a predetermined store from the mobile terminal 20 that has identification information including the store ID (a piece of information included in a two-dimensional code) which is obtained in advance over the network 40.

The information provision method according to the first embodiment also involves referring to a first database (the user information DB 15) and a second database (the game app information DB 14) in accordance with the application ID and the app user ID to transmit first indication data (a piece of reward screen information) indicating that a first game remuneration corresponding to the progress level of the game is provided to the mobile terminal 20 over the network 40.

In the user achievement information 152 in the user information DB 15, the progress level of the game for the user is managed in association with the application ID and the user ID. In the reward probability information 145 in the game app information DB 14, a first game remuneration ID (reward ID) indicating the first game remuneration provided so as to correspond to the application ID and the progress level of the game is managed.

Specifically, the information provision method involves referring to a third database (the store attribute information 131 in the store information DB 13) which manages a registered store registered to determine whether the store indicated by the received store ID is included in the registered store (S285 of FIG. 52), and transmitting the first indication data to the mobile terminal 20 over the network 40 (S295 of FIG. 52) if the store indicated by the received store ID is included in the registered store.

The above-described identification information includes first location information indicating a location of the predetermined store (a store ID included in a piece of identification information is associated with a piece of location information (a latitude and a longitude) in the store attribute information 131).

The information provision method involves obtaining second location information indicating a location of the mobile terminal 20 from the mobile terminal 20, using a GPS system (S281 of FIG. 52), and transmitting the first indication data to the mobile terminal 20 over the network 40 (S295 of FIG. 52) if the location indicated by the second location information is within a predetermined distance of the location indicated by the first location information (YES in S285 of FIG. 52).

The information provision method involves managing state information indicating that the first game remuneration is already provided (a reward-provided flag of "TRUE") for the user that is running the application indicated by the application ID and is indicated by the user ID after the first indication data is transmitted to the mobile information terminal.

The first indication data includes a piece of advertisement information (the banner image in FIG. 56) saying that an additional game remuneration is given upon buying at the store indicated by the store ID. The information provision method involves receiving the application ID together with a purchase ID indicating buying of merchandise or service at the store 30 (a buying ID included in each of the two-dimensional codes shown in FIGS. 57A and 57B) from the mobile terminal 20 that has the purchase ID read in advance over the network 40 (S281 of FIG. 52).

The information provision method also involves referring to a third database (the purchaser benefit reward information 146 in the game app information DB 14) which manages the application ID and a second game remuneration ID (reward ID) indicating a second game remuneration provided so as to correspond to the application ID, in accordance with the application ID (S303 of FIG. 58) to transmit second indication data (a piece of reward screen information) indicating that the second game remuneration is additionally provided to the mobile terminal 20 over the network 40 (S305 of FIG. 58).

The third database manages a benefit ID (purchaser benefit ID) indicating within which price range purchased merchandise or service falls in association with the application ID and the second game remuneration ID.

The information provision method involves receiving the application ID together with the purchase ID and the benefit ID from the mobile terminal 20 that has the purchase ID and the benefit ID read in advance over the network 40 (S281 of FIG. 52) and referring to the third database in accordance with the benefit ID and the application ID (S303 of FIG. 58) to transmit the second indication data indicating that the second game remuneration is additionally provided to the mobile terminal 20 over the network 40.

The above-described information provision method allows a player of a game to be given an incentive to visit the real store 30.

Other Embodiments

As described above, the first embodiment has been described as an example of a technique disclosed in the present disclosure. The technique in the present disclosure, however, is not limited to this and can also be applied to embodiments in which changes, replacements, additions, omissions, and the like are made as necessary. Constituent elements described in the first embodiment may be combined together to obtain a new embodiment.

In the first embodiment, although checkin has been described as a process of reading a two-dimensional code with the image pickup unit of the mobile terminal 20, checkin may be performed by a method other than reading of a two-dimensional code as long as the mobile terminal 20 can obtain a store ID. For example, checkin may be performed using a store ID distributed through wireless communication at the store 30.

For the wireless communication, for example, a communication standard, such as a wireless LAN or Bluetooth®, is used. This case has the advantage in that if a range within which wireless communication is possible (the field intensity of wireless communication) is set so as to fall within a predetermined range, the process of judging whether a location where the two-dimensional code is read is near the store 30 (the processes in steps S284 to S286 of FIG. 52) is unnecessary.

The plurality of databases described in the first embodiment (the store information DB 13, the game app information DB 14, and the user information DB 15) may be configured as one database. The details of pieces of information stored in the databases in the first embodiment and distribution of the pieces of information among the databases are merely exemplary and are not particularly limited. Although the server 10 includes the plurality of databases in the first embodiment, the plurality of databases may be provided outside the server 10.

An advertisement (banner advertisement) saying that an event for checkin-based reward provision is being held may be displayed on the game screen 27b, the stamp sheet screen 27c, or the item provision screen 27d in the first embodiment. Such an advertisement may be displayed when a user is found to be located within a predetermined distance of a location of the store 30 through obtainment of a piece of location information by the location information obtainment unit of the mobile terminal 20. This allows further attraction of customers to the store 30. Note that display of such an advertisement can be implemented using the same process as the process described in the first embodiment of judging whether a user of the mobile information terminal 20 (the mobile terminal 20) is near the store 30.

Note that, in each of the embodiments, each constituent element may be implemented as dedicated hardware or may be implemented by executing a software program suitable for the constituent element. Each constituent element may be implemented by reading out and executing a software program recorded in a recording medium, such as a hard disk or a semiconductor memory, by a program execution unit, such as a CPU or a processor.

In the first embodiment, a process to be executed by a specific processing unit may be executed by another processing unit. The order of a plurality of processes may be changed, and a plurality of processes may be executed in parallel.

Although an information provision method according to one or more aspects has been described above on the basis of the embodiments, the present disclosure is not limited to the embodiments. Various modifications to the embodiments that can be conceived by those skilled in the art and forms configured by combining constituent elements in different embodiments without departing from the spirit of the present disclosure may be included in the scope of the one or more aspects.

The present disclosure is applicable to a game or the like which is downloaded to a mobile terminal, such as a smartphone.

What is claimed is:

1. A method for providing information in an information management system connected over a network to an information equipment, the information equipment storing a game application and having a display, a game remuneration being obtained corresponding to a progress level of a game using the game application, the method comprising:

receiving, from the information equipment,
- an application ID indicating the game application running on the information equipment,
- a user ID indicating a user of the game application, and
- a store ID indicating a predetermined shop store having a physical real-world location when the information equipment acquires the store ID from the predetermined shop store; and referring, in accordance with the application ID and the user ID,
- to a first database which manages the progress level of the game for the user of the game application in association with the application ID and the user ID, and
- to a second database which manages the application ID and a first game remuneration ID that indicates a first game remuneration corresponding to the progress level of the game;

referring to a third database which manages a plurality of shop stores registered by the information management system to determine whether the predetermined shop store indicated by the received store ID is included in the third database as one of the registered shop stores;

obtaining, using GPS, a physical real-world location of the information equipment, and determining, whether the physical real-world location of the information equipment is within a predetermined distance of the physical real-world location of the predetermined shop store corresponding to the store ID;

adjusting the first game remuneration in the game application game when the predetermined shop store indicated by the received store ID is included in the third database as a registered shop store, and the physical real-world location of the information equipment is determined to be within the predetermined distance of the physical real-world location of the predetermined shop store; and transmitting, over the network to the information equipment, first indication data indicating that the adjusted first game remuneration corresponding to the progress level of the game is provided to the user of the game application, wherein the first game remuneration in the game application is caused by a movement of the information equipment with respect to the real-world location of the predetermined shop store, and wherein the first game remuneration is an item of value in the game application.

2. The method according to claim 1, further comprising: displaying a stamp card on which a first predetermined number of stamps provided, on the display of the information equipment based on the first indication data, if the first game remuneration indicates the first predetermined number of stamps.

3. The method according to claim 2, wherein the first predetermined number of stamps increases with increase in the progress level of the game.

4. The method according to claim 1, further comprising: displaying, on the display of the information equipment and based on the first indication data, first display data indicating that the user has obtained a second predetermined number of game items used in the game application, if the first game remuneration indicates the second predetermined number of game items.

5. The method according to claim 4, wherein the second predetermined number increases with increase in the progress level of the game.

6. The method according to claim 1, wherein the first indication data includes advertisement information representing that an additional game remuneration is provided to the user of the game application upon buying at the predetermined shop store indicated by the store ID, and the information provision method further includes
- receiving the application ID together with a purchase ID indicating buying of merchandise or service at the predetermined shop store, over the network from the information equipment that has read the purchase ID in advance, and
- referring to, in accordance with the application ID, the third database which manages the application ID and a second game remuneration ID that indicates a second game remuneration corresponding to the application ID, and transmits over the network to the information equipment second indication data indicating that the second game remuneration is additionally provided to the user of the game application.

7. The method according to claim 6, wherein the third database manages a benefit ID indicating within which price range purchased merchandise or service falls in association with the application ID and the second game remuneration ID, and the information provision method further includes
- receiving the application ID together with the purchase ID and the benefit ID over the network from the information equipment that has read the purchase ID and the benefit ID in advance, and
- referring to, in accordance with the benefit ID and the application ID, the third database, and transmits over the network to the information equipment the second indication data indicating that the second game remuneration is additionally provided to the user of the game application.

8. The method according to claim 6, further comprising: displaying a stamp card on which a third predetermined number of stamps additionally provided, on the display of the information equipment based on the second indication data, if the second game remuneration indicates the third predetermined number of stamps.

9. The method according to claim 8, wherein the third predetermined number increases with increase in the progress level of the game.

10. The method according to claim 6, further comprising: displaying, on the display of the information equipment and based on the second indication data, second display data indicating that the user has obtained a fourth predetermined number of game items used in the game application, if the second game remuneration indicates the fourth predetermined number of game items.

11. The method according to claim 10, wherein the fourth predetermined number increases with increase in the progress level of the game.

12. The method according to claim 1, wherein the information management system manages state information indicating that the first game remuneration is already provided to the user of the game application indicated by the application ID and is indicated by the user ID after the first indication data is transmitted to the information equipment.

13. The method according to claim 1, wherein the first database is identical to the second database.

* * * * *